United States Patent
Koizumi et al.

(10) Patent No.: US 10,791,209 B2
(45) Date of Patent: Sep. 29, 2020

(54) TERMINAL APPARATUS, COMMUNICATION SYSTEM, AND NON-TRANSITORY COMPUTER-READABLE STORAGE MEDIUM STORING PROGRAM

(71) Applicant: SEIKO EPSON CORPORATION, Tokyo (JP)

(72) Inventors: Junpei Koizumi, Matsumoto (JP); Kenji Sakuda, Hamamatsu (JP); Naoki Kojima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/560,309

(22) Filed: Sep. 4, 2019

(65) Prior Publication Data

US 2020/0084313 A1  Mar. 12, 2020

(30) Foreign Application Priority Data

Sep. 6, 2018 (JP) .................................. 2018-166530

(51) Int. Cl.
*H04M 1/725* (2006.01)
*H04L 29/06* (2006.01)
*H04N 1/00* (2006.01)
*H04W 12/06* (2009.01)
*H04W 84/12* (2009.01)

(52) U.S. Cl.
CPC ...... *H04M 1/72533* (2013.01); *H04L 63/083* (2013.01); *H04M 1/7253* (2013.01); *H04N 1/0048* (2013.01); *H04N 1/00395* (2013.01); *H04N 1/00411* (2013.01); *H04W 12/06* (2013.01); *H04W 84/12* (2013.01)

(58) Field of Classification Search
None
See application file for complete search history.

(56) References Cited

U.S. PATENT DOCUMENTS

| 2010/0067406 | A1  | 3/2010 | Suzuki et al. |
| 2016/0100356 | A1* | 4/2016 | Liu ...................... H04W 48/18 370/329 |
| 2017/0202035 | A1* | 7/2017 | Yokoyama .............. H04W 8/26 |
| 2017/0237870 | A1  | 8/2017 | Kojima et al. |
| 2018/0124555 | A1* | 5/2018 | Yoon ....................... H04W 4/80 |

FOREIGN PATENT DOCUMENTS

| EP | 2961078 | 12/2015 |
| JP | 2011-188518 | 9/2011 |

OTHER PUBLICATIONS

European Search Report issued in corresponding application No. EP19195441 dated Jan. 14, 2020.

* cited by examiner

*Primary Examiner* — Frantz Bataille
(74) *Attorney, Agent, or Firm* — Workman Nydegger

(57) ABSTRACT

A communication unit transmits an SSID of an access point which is a connection target in a first wireless communication scheme to electronic equipment in compliance with a second wireless communication scheme and receives an identifier of the electronic equipment in compliance with both the first wireless communication scheme and the second wireless communication scheme. When it is determined that both identifiers match, a processing unit notifies that a connection between the electronic equipment and the access point is successful.

11 Claims, 9 Drawing Sheets

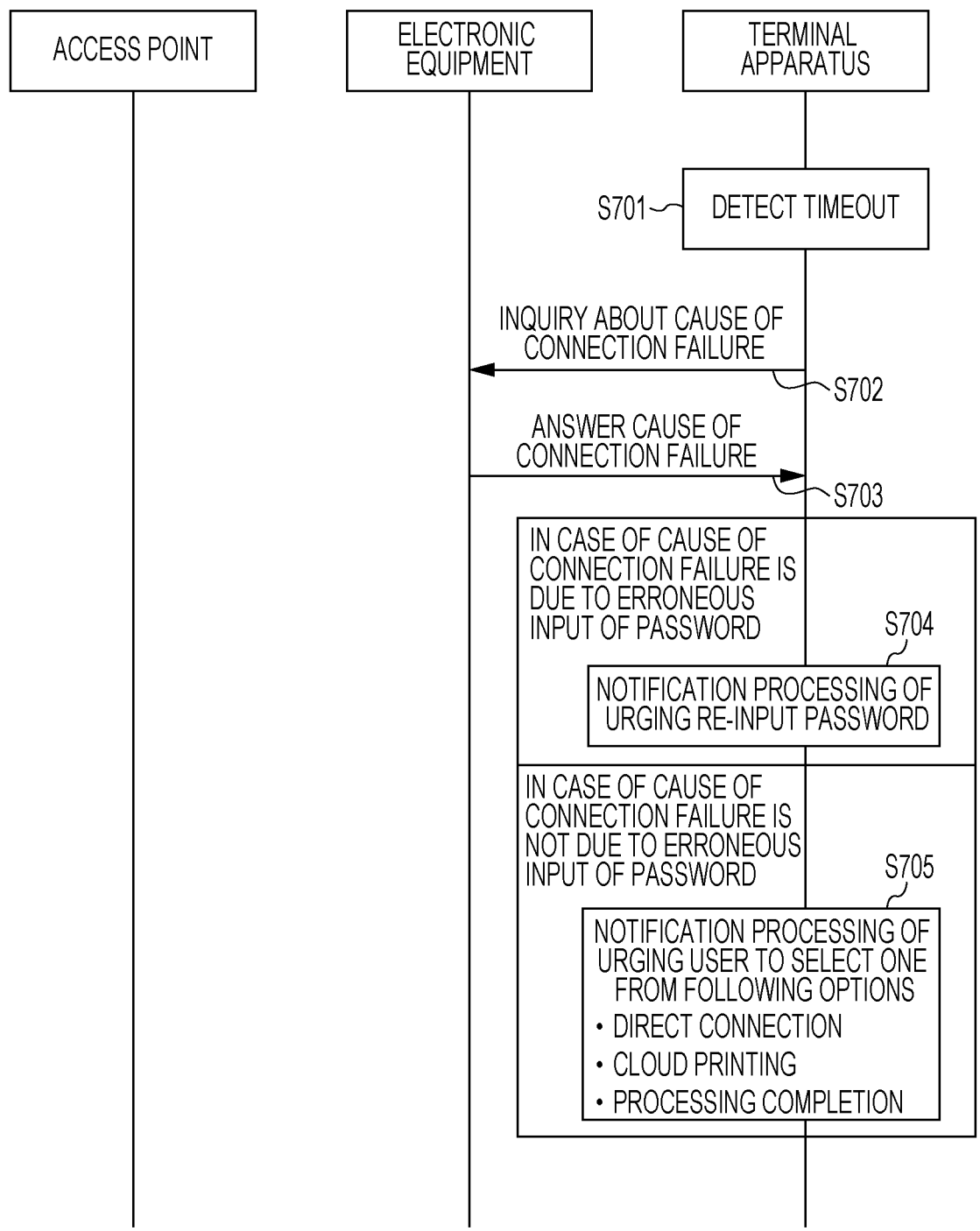

TERMINAL APPARATUS, COMMUNICATION SYSTEM, AND NON-TRANSITORY COMPUTER-READABLE STORAGE MEDIUM STORING PROGRAM

The present application is based on, and claims priority from JP Application Serial Number 2018-166530, filed Sep. 6, 2018, the disclosure of which is hereby incorporated by reference herein in its entirety.

BACKGROUND

1. Technical Field

The present disclosure relates to a terminal apparatus, a communication system, and a non-transitory computer-readable storage medium storing a program.

2. Related Art

In JP-A-2011-188518, a technology is disclosed in which a user selects an SSID of a connection target from among service set identifiers (SSIDs) that are displayed on a display unit of a multifunction machine that is capable of making a connection to a wireless local area network (LAN) by operating an operation unit, such that the multifunction machine makes a wireless connection to an access point (AP) to be connected.

It is conceivable to perform a wireless connection setting of electronic equipment such as a printer using a terminal apparatus such as a smartphone. For example, in a case where a display unit of the electronic equipment is small, or in a case where the electronic equipment does not have the display unit at first, it is effective to use the terminal apparatus for a connection setting.

However, when the connection setting of the electronic equipment is performed using the terminal apparatus, the user is not always in front of the display unit of the electronic equipment. Thus, even though it is displayed that wireless connection is successful on the display unit of the electronic equipment, there is a concern that the user may not notice it. Further, it is not preferable to force the user to move to a position where the display unit of the electronic equipment is visible in order to make the user to surely recognize the result of the wireless connection, from the viewpoint of convenience.

SUMMARY

According to an aspect of the present disclosure, there is provided a terminal apparatus including: a communication unit that performs communication with electronic equipment; and a processing unit that performs control of the communication unit, in which the communication unit transmits an SSID corresponding to an access point that is a connection target in a first wireless communication scheme of the electronic equipment to the electronic equipment in compliance with a second wireless communication scheme, and receives an identifier of the electronic equipment from the electronic equipment in compliance with the second wireless communication scheme, and when the communication unit receives the identifier of the electronic equipment transmitted by the electronic equipment after the transmission of the SSID in compliance with the second wireless communication scheme in compliance with the first wireless communication scheme and it is determined that the identifier received in compliance with the first wireless communication scheme matches the identifier received in compliance with the second wireless communication scheme, the processing unit performs notification processing of notifying that a connection between the electronic equipment and the access point is successful.

BRIEF DESCRIPTION OF THE DRAWINGS

FIG. 9 is a diagram for describing a processing sequence at the time of connection failure.

DESCRIPTION OF EXEMPLARY EMBODIMENTS

Hereinafter, the present embodiment will be described. It is noted that the present embodiment which will be described below does not improperly limit the subject matter of the present disclosure that is claimed in claims. Furthermore, all configurations that will be described in the present embodiment are not necessarily configurational requirements for the present disclosure.

1. Example of Systematic Configuration

Figure 1:
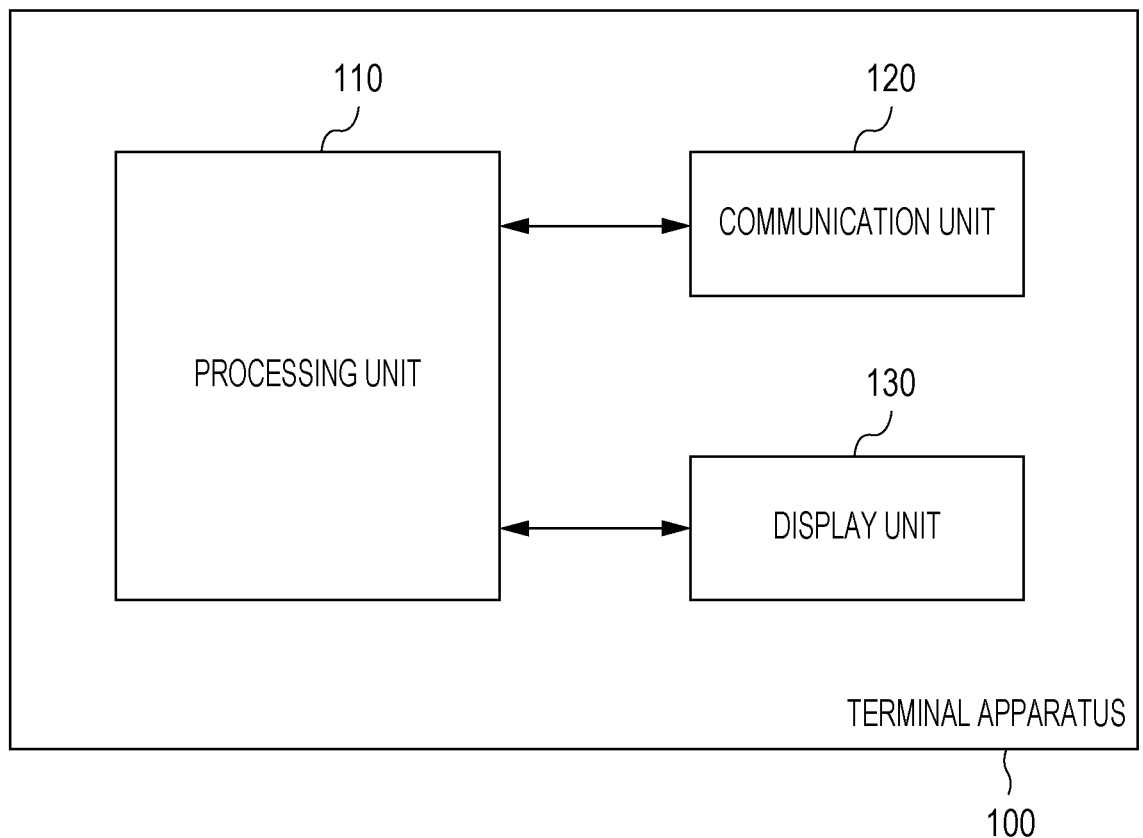
FIG. 1 is a diagram illustrating an example of a configuration of a terminal apparatus.

FIG. 1 is a block diagram illustrating an example of a configuration of a terminal apparatus 100 according to the present embodiment. The terminal apparatus 100 is a portable terminal apparatus, such as a smartphone or a tablet terminal. However, the terminal apparatus 100 may be another apparatus such as a personal computer (PC).

The terminal apparatus 100 includes a processing unit 110, a communication unit 120, and a display unit 130. For example, the processing unit 110 is a processor or a controller, the communication unit 120 is a communication interface, and the display unit 130 is a display.

The processing unit 110 performs control of the communication unit 120 and performs display processing on the display unit 130. The processing unit 110 of the present embodiment is configured by the following hardware. The hardware may include at least one of a circuit for processing a digital signal and a circuit for processing an analog signal. For example, the hardware can be configured with one or a plurality of circuit devices that are mounted on a circuit substrate, or with one or a plurality of circuit elements. The one or the plurality of circuit devices are, for example, ICs and the like. The one or the plurality of circuit elements are, for example, resistors, capacitors, and the like.

The processing unit 110 may be realized by the following processor. The terminal apparatus 100 of the present embodiment includes a memory storing information, and a processor which operates based on the information stored in the memory. The information is, for example, programs, various kinds of data, and the like. The processor includes a hardware. As the processor, it is possible to use various processors such as a central processing unit (CPU), a graphics processing unit (GPU), a digital signal processor (DSP), and the like. The memory may be a semiconductor memory, such as a static random access memory (SRAM) or a dynamic random access memory (DRAM), a register, a magnetic storage device such as a hard disk drive (HDD), and an optical storage device such as an optical disk device. For example, a memory stores readable instructions by a computer, the instruction is executed by a processor, and the function of each section of the terminal apparatus 100 is implemented as a process. The instruction here may be an instruction of an instruction set configuring the program, and may be a command for instructing an operation to the hardware circuit of the processor.

The communication unit 120 performs communication with the access point and the electronic equipment via an antenna (not shown). The access point here is an apparatus that performs wireless communication in compliance with the Wi-Fi (registered trademark) standards and is an apparatus that is different from the terminal apparatus 100 and electronic equipment 200. The display unit 130 is configured with a display and the like on which various kinds of information is displayed to the user.

Figure 2:
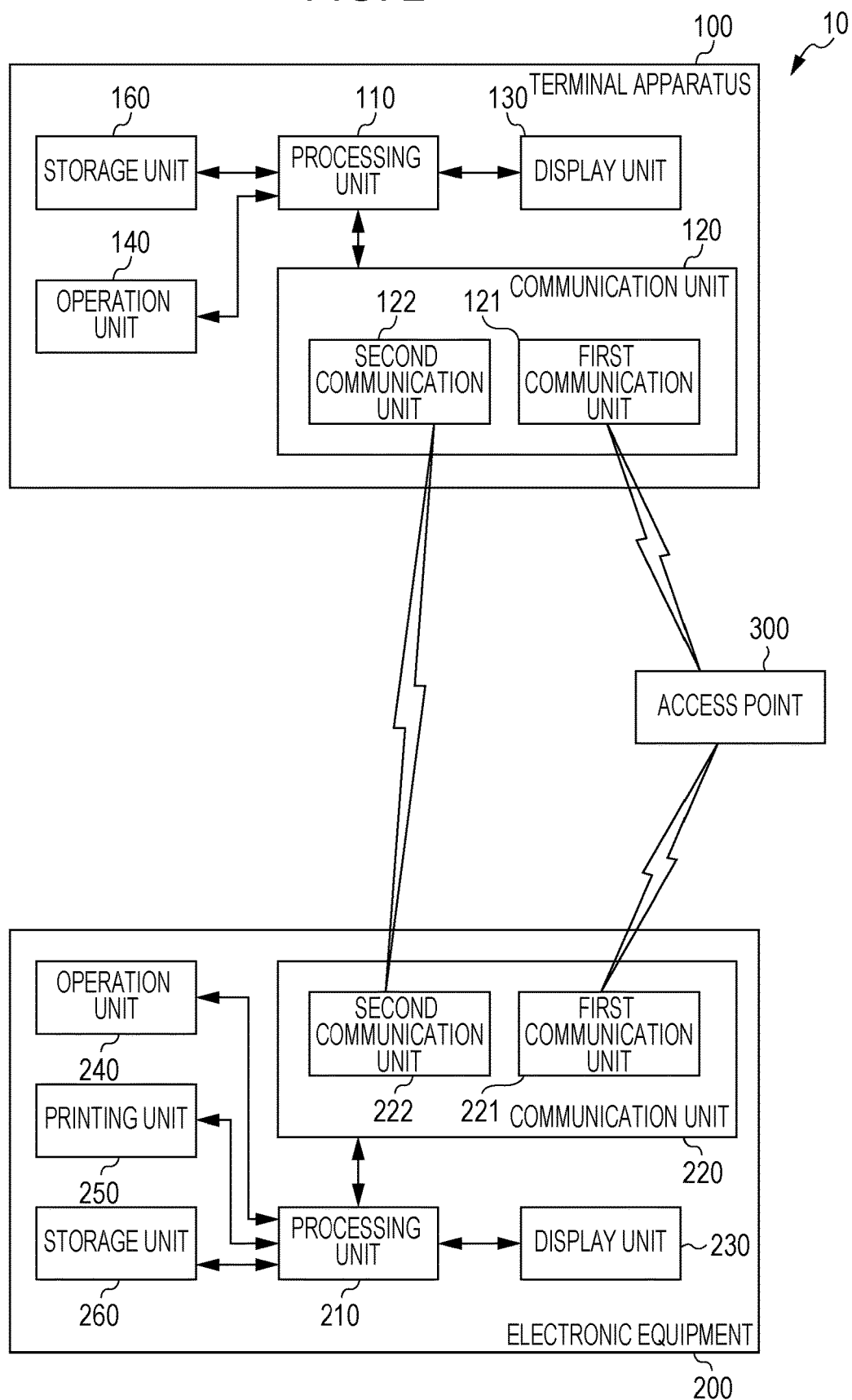
FIG. 2 is a diagram illustrating an example of a configuration of a communication system including a terminal apparatus and electronic equipment.

FIG. 2 is a diagram schematically illustrating an example of a communication system 10 that includes the terminal apparatus 100 according to the present embodiment. The communication system 10 includes the terminal apparatus 100 and the electronic equipment 200.

The communication unit 120 of the terminal apparatus 100 includes a first communication unit 121 and a second communication unit 122. The first communication unit 121 is a wireless communication device that performs wireless communication in compliance with a first wireless communication scheme, and performs communication with an access point 300. The second communication unit 122 is a wireless communication device that performs wireless communication in compliance with a second wireless communication scheme and performs communication with the electronic equipment 200. Each wireless communication device, for example, is a chip or a module that performs wireless communication. In the present embodiment, although the first communication unit 121 and the second communication unit 122 respectively perform communication via different antennas, the first communication unit 121 and second communication unit 122 may perform communication via the same antenna.

The first wireless communication scheme is a wireless LAN in a narrow sense, and more specifically, Wi-Fi. The second wireless communication scheme is a wireless communication scheme that is different from the first wireless communication scheme. The second wireless communication scheme is, for example, a wireless communication scheme conforming to the standard of Bluetooth (registered trademark), and is a wireless communication scheme conforming to the Bluetooth Low Energy standards in a narrow sense. Bluetooth Low Energy will be described below as BLE. However, other communication methods may be used as the first wireless communication scheme and the second wireless communication scheme.

In this manner, by using a different wireless communication scheme, it becomes easy to connect the electronic equipment 200 to an appropriate access point 300 using the terminal apparatus 100.

For example, with the use of BLE as the second wireless communication scheme, the connection between the terminal apparatus 100 and the electronic equipment 200 can be established more easily compared to the case of using Wi-Fi, it is possible to smoothly perform transmission and reception of information for connecting the electronic equipment 200 to the access point.

Furthermore, in addition to the configuration illustrated in FIG. 1, the terminal apparatus 100 includes an operation unit 140 and a storage unit 160. The operation unit 140 is configured with a button or the like which receives an input operation from a user. The display unit 130 and the operation unit 140 may be integrally configured by a touch panel.

The storage unit 160 stores various kinds of information such as data and program. The processing unit 110 or the communication unit 120, for example, operates with the storage unit 160 as a working area. The storage unit 160 may be a semiconductor memory such as an SRAM and a DRAM, and may be a register. And the storage unit 160 may be a magnetic storage device such as a hard disk device and an optical storage device such as an optical disk device and the like.

The electronic equipment 200 is, for example, a printer. Alternatively, the electronic equipment 200 may be a scanner, a facsimile machine, or a copy machine. The electronic equipment 200 may be a multifunction peripheral (MFP) that has a plurality of functions, and a multifunction peripheral that has a printing function is also an example of the printer. The electronic equipment 200 may be a projector, a head-mounted display, wearable equipment, biological information measuring equipment, such as a pulse meter or a physical activity meter, a robot, video equipment such as a camera, a portable information terminal such as a smartphone, physical quantity measuring equipment, or the like.

The electronic equipment 200 includes a processing unit 210, a communication unit 220, a display unit 230, an operation unit 240, a printing unit 250, and a storage unit 260.

The processing unit 210 performs control of each of the units of the electronic equipment 200. For example, the processing unit 210 can include a plurality of CPUs, such as a main CPU and a sub-CPU, or a micro-processing unit (MPU). The main CPU performs control of each of the units of the electronic equipment 200 or overall control of the electronic equipment 200. The sub-CPU performs various processing operations for printing, for example, in a case where the electronic equipment 200 is a printer. Alternatively, a CPU for communication processing may be further provided.

The communication unit 220 includes a first communication unit 221 and a second communication unit 222. The first communication unit 221 performs the communication with the access point 300 through wireless communication conforming to the first wireless communication scheme. The second communication unit 222 performs communication with the terminal apparatus 100 through wireless communication conforming to the second wireless communication scheme. Each wireless communication device is, for example, a chip or a module that performs wireless communication.

The display unit 230 is configured with a display on which various kinds of information are displayed for the user, and the like, and the operation unit 240 is configured with a button which receives an input operation from the user, and the like. It is noted that, for example, the display unit 230 and the operation unit 240 may be integrally configured by a touch panel.

The printing unit 250 includes a printing engine. The printing engine has a mechanical configuration in which printing of an image is performed on a printing medium. The printing engine, for example, includes a transportation mechanism, an ink jet type discharge head, and a driving mechanism for a carriage including the discharge head, and the like. The printing engine discharges ink from the discharge head onto the printing medium that is transmitted by the transportation mechanism, and thus prints an image on the printing medium. As the printing medium, various media can be used such as a paper sheet and a piece of cloth. It is noted that a specific configuration of the printing engine is not limited to that described here as an example and may be one in which printing that uses toner is performed using an electrophotographic method.

The storage unit 260 stores various pieces of information such as data and programs. The processing unit 210 or the communication unit 220, for example, operates with the storage unit 260 as a working area. The storage unit 260 may be a semiconductor memory, a register, a magnetic memory device, and an optical storage device.

2. Flow of Processing

The present embodiment will be described below. First, the outline of processing will be described and then the specific processing will be described with reference to FIGS. 5 to 8. And some modifications also will be described.

2.1 Overview

It is considered that setting relating to a wireless connection to the electronic equipment 200 is performed using the terminal apparatus 100. For example, in a case where the display unit 230 of the electronic equipment 200 is small-sized, or in a case where the electronic equipment 200 does not have the display unit 230, the use of the terminal apparatus 100 is effective for the connection setting. Furthermore, even when the electronic equipment 200 has a display panel or the like, it is possible to easily perform a setting operation by using the terminal apparatus 100 familiar to the user.

As a connection setting method of the electronic equipment 200 using the terminal apparatus 100, for example, a method is considered in which the electronic equipment 200 performs SSID scanning and thus creates an SSID list and in which the SSID list is displayed on the display unit 130 of the terminal apparatus 100. The user selects an SSID from the displayed list and inputs a password corresponding to the SSID. The terminal apparatus 100 transmits the SSID and the password to the electronic equipment 200 and thus performs a wireless connection to the electronic equipment 200.

If it is intended to set the electronic equipment 200 to be in a state of being available for Wi-Fi communication, the selection of the SSID by the user is easy. Since the access point that is a connection target is optional when a password is already known, any SSID that is included in the SSID list may be selected.

However, in some cases, the transmission and reception of the information are performed between the terminal apparatus 100 and the electronic equipment 200. For example, in a case where the electronic equipment 200 is a printing apparatus, printing data is created in the terminal apparatus 100. Thereafter, the printing data is transmitted to the electronic equipment 200 through wireless communication, and printing is performed in the electronic equipment 200. Because BLE is lower in communication speed than Wi-Fi, in a case where a certain amount of data, such as the printing data, is transferred, it is possible that user convenience is improved by using Wi-Fi.

On this occasion, it is desirable that the terminal apparatus 100 and the electronic equipment 200 makes a connection to the same access point. When this is done, the terminal apparatus 100 and the electronic equipment 200 include the network segment. Because of this, it is possible that data is transmitted and received reliably and securely between the terminal apparatus 100 and the electronic equipment 200.

However, when performing connection setting of the electronic equipment 200 using the terminal apparatus 100, it is necessary to consider a method to make the user confirm the success or failure of the connection. As in the related art, when the user operates the operation unit 240 of the electronic equipment 200 such as the printer panel performs the connection setting of the electronic equipment 200, the user is considered to be in front of the printer panel serving as the display unit 230. Therefore by displaying the fact that the wireless connection is successful on the printer panel, the user can easily grasp that the wireless connection is successful.

On the other hand, when wirelessly connecting the electronic equipment 200 to the access point 300 using the terminal apparatus 100 such as a smartphone, the user is not always in front of the printer panel. Therefore, even when the fact that the wireless connection is successful is displayed on the printer panel, there is a concern that the user may not notice it. Further, it is inconvenient and undesirable for the user to force the user to move to the position where the printer panel is visible in order to recognize the results of the wireless connection.

Therefore the terminal apparatus 100 of the present embodiment performs notification processing of notifying that the connection between the access point 300 and the electronic equipment 200 is successful. The terminal apparatus 100 according to the present embodiment, as shown in FIG. 1, includes a communication unit 120 that communicates with the electronic equipment 200 and the processing unit 110 controls the communication unit 120. The communication unit 120 transmits an SSID corresponding to the access point 300 which is a connection target in the first wireless communication scheme of the electronic equipment 200 to the electronic equipment 200 in compliance with the second wireless communication scheme. Here, the access point 300 which is a connection target, is an access point to which the electronic equipment 200 is a target to be connected, and is an access point to which the terminal apparatus 100 has already connected in a narrow sense. Thus, by transmitting the information required for a wireless connection to the electronic equipment 200, by using the terminal apparatus 100, it becomes possible to perform connection setting of the electronic equipment 200.

For example, the communication unit 120 receives the SSID list obtained by the scanning processing by the electronic equipment 200 using the first wireless communication scheme, from the electronic equipment 200 in compliance with the second wireless communication scheme. The communication unit 120 transmits an SSID selected from the SSID list by the user to the electronic equipment 200 in compliance with the second wireless communication scheme as the SSID corresponding to the access point 300 which is a connection target of the electronic equipment 200. The communication unit 120 transmits the password corresponding to the SSID to the electronic equipment 200 in compliance with the second wireless communication scheme.

In this way, it becomes possible to urge the user to select an appropriate SSID using the SSID list. For example, the processing unit 110 executes the processing of S205 of FIG.

4 to be described later. However, as will be described later with reference to S201 to S204 in FIG. 4, the processing unit 110 may perform processing of transmitting a specific SSID to the electronic equipment 200 without acquiring the SSID list. That is, in the method of the present embodiment, it is sufficient to transmit the appropriate SSID from the terminal apparatus 100 to the electronic equipment 200, and the specific method can be variously modified. However, whether to present the SSID list, or to present a specific SSID, the SSID to be transmitted is desirably the SSID selected by the selection operation by the user.

The terminal apparatus 100 of the present embodiment, by performing communication with the electronic equipment 200 in compliance with the first wireless communication scheme, determines whether the connection between the electronic equipment 200 and the access point 300 has succeeded. In the present embodiment, it is assumed that the connection in compliance with the first wireless communication scheme between the terminal apparatus 100 and the access point 300 is established. That is, when the connection between the electronic equipment 200 and the access point 300 is successful, a communication path in compliance with the first wireless communication scheme exists between the terminal apparatus 100 and the electronic equipment 200, and the communication path does not exist when the connection fails. Thus, by attempting to perform communication conforming to Wi-Fi standards, it is possible to appropriately determine whether the wireless connection has succeeded or failed.

For example, the communication unit 120 receives the identifier of the electronic equipment 200 from the electronic equipment 200 in compliance with the second wireless communication scheme. The processing unit 110 performs notification processing of notifying that the connection between the electronic equipment 200 and the access point 300 has succeeded when the following conditions are met after the transmission of the SSID in compliance with the second wireless communication scheme. Specifically, the processing unit 110 performs the notification processing when the communication unit 120 receives the identifier of the electronic equipment 200 in compliance with the first wireless communication scheme which is transmitted by the electronic equipment 200 and it is determined that the identifier received in compliance with the first wireless communication scheme matches the identifier received in compliance with the second wireless communication scheme.

Thus, by performing the matching process of matching the identifier acquired through BLE in advance and the identifier acquired through Wi-Fi, it becomes possible to determine whether the counterpart of the communication is the electronic equipment 200 which is the setting target, in addition to determining whether the communication through Wi-Fi is performed. The identifier here is, for example, the MAC address of the electronic equipment 200. However, the identifier may be any information capable of identifying the electronic equipment 200, a manufacturing number of the device, other information such as a serial number may be used. Examples using the identifier will be described later with reference to FIGS. 5 and 6.

Alternatively the communication unit 120 may transmit the IP address of the terminal apparatus 100 to the electronic equipment 200 in compliance with the second wireless communication scheme. Terminal apparatus 100 is assumed to be already connected to the access point 300, the IP address of the terminal apparatus 100 is also known in the stage before the completion of connection between the electronic equipment 200 and the access point 300. The processing unit 110 performs notification processing of notifying that the connection between the electronic equipment 200 and the access point 300 is successful when the communication unit 120 receives a notification from the electronic equipment 200 in compliance with the first wireless communication scheme in a given time. The given time here is, for example, a time set based on the transmission timing of the IP address or transmission timing of the SSID, and is, for example, a given length of time starting from any transmission timing.

By transmitting the IP address of the terminal apparatus 100 to the electronic equipment 200, it is possible to transmit the data designating the terminal apparatus 100 from the electronic equipment 200 side. The terminal apparatus 100 can determine that Wi-Fi communication with the electronic equipment 200 is performed by receiving the data addressed to its own IP address. Since the processing unit 110 uses the information transmission to the electronic equipment 200 as a trigger to set the given time which is a standby period, when the notification is received within the time, it can be determined that the notification is likely to be transmitted from the electronic equipment 200. Examples using the IP address will be described later with reference to FIG. 7.

Further, there is no limitation to using the method of using the identifier, and the method of notifying the IP address in advance, in combination. Specifically, the processing unit 110 receives the data addressed to its own IP address within a given time, and, if it is determined that the identifier through BLE and the identifier through Wi-Fi match, performs notification processing. For an example of using the identifier and IP address in combination, it will be described below with reference to FIG. 8.

2.2 Determination Based on MAC Address

First, based on the determination using the identifier, a method of performing notification processing will be described. Specifically, a polling method of periodically requesting acquisition of an identifier from the terminal apparatus 100, and a wait method of waiting for transmission of the identifier from the electronic equipment 200 will be described. In the following, an example will be described in which the identifier of the electronic equipment 200 is a MAC address.

2.2.1 Polling Method

Figure 3:
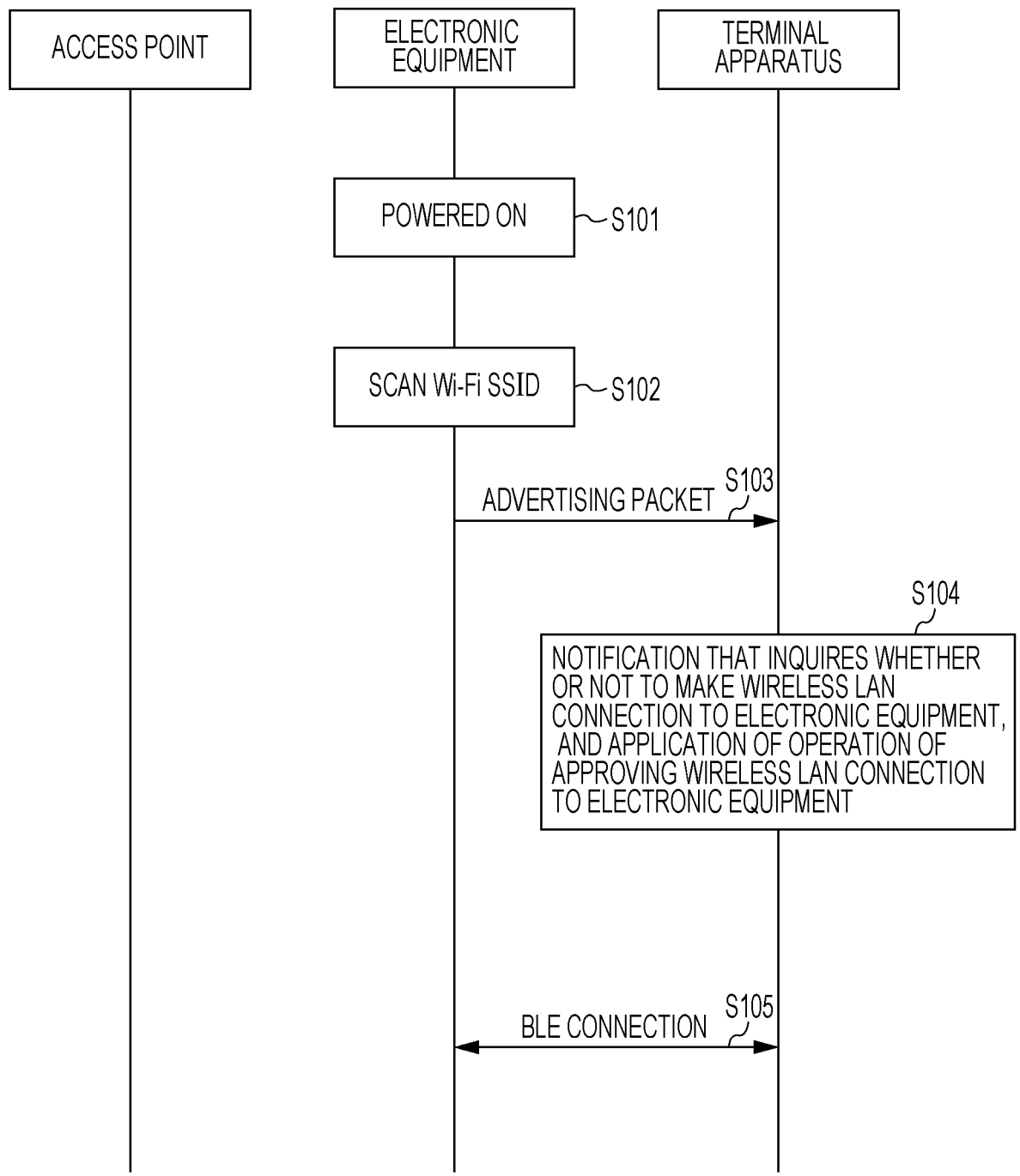
FIG. 3 is a diagram for describing a BLE connection sequence.

FIG. 3 is a diagram for explaining a flow of performing a connection through BLE between the terminal apparatus 100 and the electronic equipment 200. To start this processing, first, the electronic equipment 200 is powered on (S101). When the electronic equipment 200 is powered on, the processing unit 210 executes firmware recorded in the storage unit 260, and thus the processing is performed as follows.

The processing unit 210 controls the first communication unit 221, thus performs reception of a beacon signal, and, based on a result of the reception, creates an SSID list (S102). The beacon signal here is a beacon signal in compliance with the Wi-Fi standards and includes an SSID. The beacon signal in compliance with the Wi-Fi standards will be expressed below as a Wi-Fi beacon. Wi-Fi beacon may include other information such as media access control address (MAC address) of the access point which is a transmission source device, channel information, and the transmission interval of the beacon.

The processing unit 210 stores the created SSID list in the storage unit 260. Specifically, the processing unit 210 acquires the SSID that is included in the beacon signal received by the first communication unit 221, and writes the acquired SSID on the SSID list. At this time, in a case where the acquired SSID is already included in the SSID list, the same SSID is not redundantly written in the SSID list.

Next, the processing unit 210 controls the second communication unit 222 and thus transmits an advertising packet, as a beacon signal in compliance with the BLE standards (S103).

When receiving the advertising packet using the second communication unit 122, the processing unit 110 of the terminal apparatus 100 displays a screen for "notification that inquires whether to make a wireless LAN connection to electronic equipment" on the display unit 130. When the user receives an operation of "approving the wireless LAN connection to the electronic equipment" using the operation unit 140, the processing unit 110 selects the electronic equipment 200 as a counterpart to establish an LBE connection (S104).

It is noted that, in a case where multiple pieces of electronic equipment that transmit the advertising packet are present, the processing unit 110 may display a screen for a list of pieces of electronic equipment on the display unit 130. At this point, the screen that is displayed is a screen on which electronic equipment, for example, are displayed in order of increasing a distance away from the terminal apparatus 100. Because distance estimation that uses the advertising packet is well known, a detailed description thereof is omitted.

Next, the processing unit 110 controls the second communication unit 122 and thus makes a BLE connection to the electronic equipment 200 (S105). It is noted that, although not illustrated in FIG. 3, subsequent to S105, a message that is generated according to a rule which is determined in advance may be transmitted and received between an application of the terminal apparatus 100 and a firmware of the electronic equipment 200. The electronic equipment 200 performs authentication processing that determines whether the message received from the terminal apparatus 100 is in accordance with the rule. The terminal apparatus 100 performs the authentication processing that determines whether the message received from the electronic equipment 200 is in accordance with the rule. However, the authentication processing is not limited to a method that uses the message, and other authentication processing may be performed. Alternatively, the authentication processing may be omitted.

By performing the processing described above, it is possible that the information transmission and reception that use the BLE connection are possible between the terminal apparatus 100 and the electronic equipment 200. Consequently, subsequent to S105, a sequence for connecting the electronic equipment 200 to the access point 300 is started.

Figure 4:
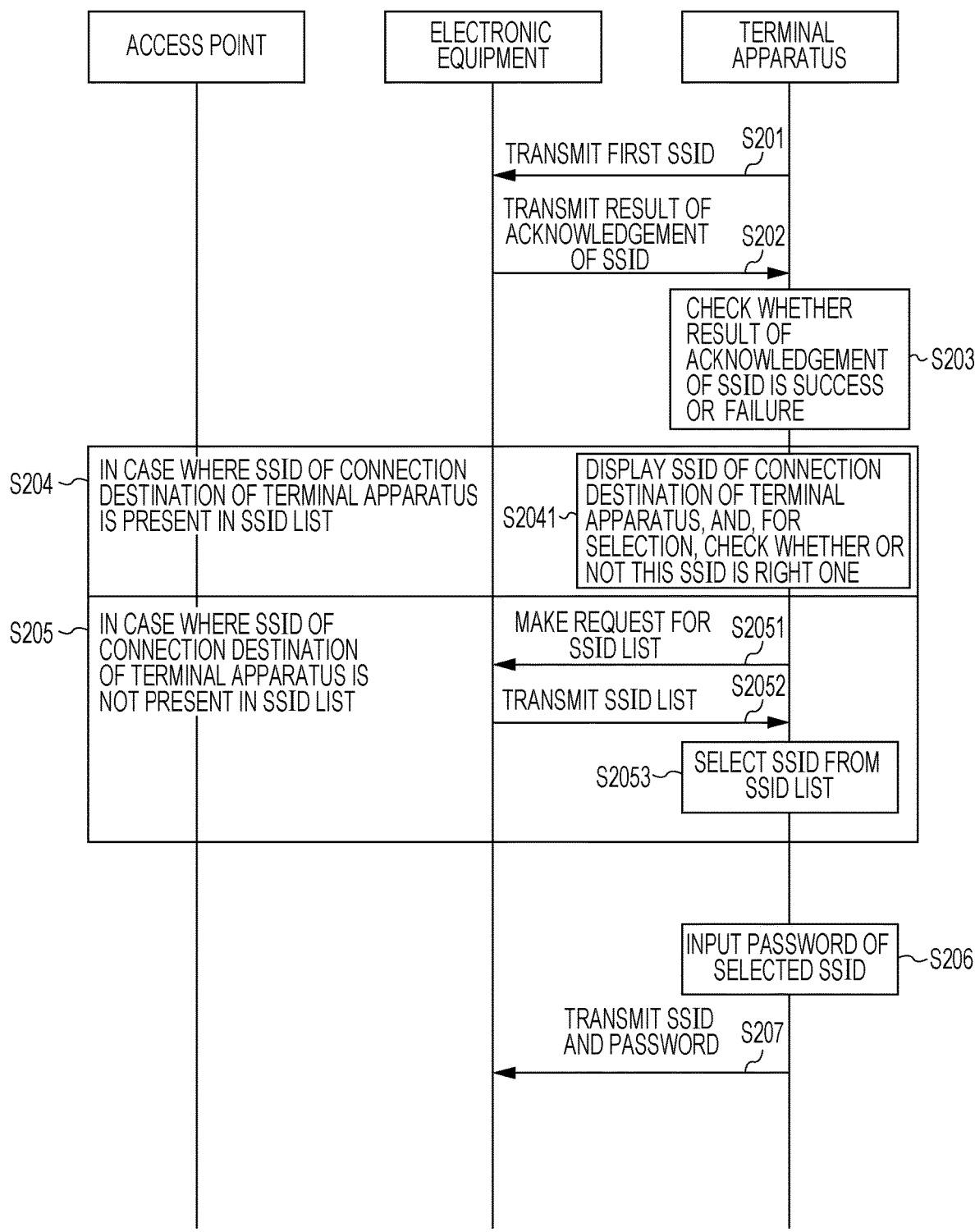
FIG. 4 is a diagram for describing a connection setting sequence of the electronic equipment by the terminal apparatus.

FIG. 4 is a diagram for describing processing that connects the electronic equipment 200 to the access point 300. First, the second communication unit 122 of the terminal apparatus 100 transmits an SSID of the access point 300 to which the first communication unit 121 establishes a Wi-Fi connection, to the electronic equipment 200 through the BLE connection. An SSID of the access point 300 to which the first communication unit 121 is making the Wi-Fi connection will be expressed below as a first SSID.

Next, the processing unit 210 of the electronic equipment 200 determines whether the first SSID is included in the SSID list acquired in S102. When it is determined that the first SSID is included in the SSID list, the processing unit 210 transmits a notification that acknowledgment of the SSID succeeds, to the terminal apparatus 100 through the BLE connection (S202). On the other hand, when it is determined that the first SSID is not included in the SSID list, the processing unit 210 transmits a notification that the acknowledgment of the SSID fails, to the terminal apparatus 100 through the BLE connection (S202).

The processing unit 110 of the terminal apparatus 100 checks notification of a result of the acknowledgment of the SSID received from the electronic equipment 200 through the BLE connection (S203). As a result of the acknowledgment of the notification, the processing branches to S204 or S205.

In a case where the notification of the success as a result of the acknowledgment of the SSID is received, the first SSID that is used by the terminal apparatus 100 for connection is equivalent to a case where it is also possible that the electronic equipment 200 conducts a search. In this case, processing in S204 is performed. Specifically, the processing unit 110 of the terminal apparatus 100 displays a screen for receiving an instruction to wirelessly connect the electronic equipment 200 to the access point 300 to which the first communication unit 121 is being connected, on the display unit 130. Specifically, the processing unit 110 displays a screen for checking whether the first SSID is selected as a connection target to the electronic equipment 200, on the display unit 130 (S2041).

When an operation of selecting the first SSID is received by the user, the processing unit 110 displays a password input screen on the display unit 130 and a password of the SSID selected from the password input screen is input to the processing unit 110 (S206). In a case where processing in S204 is performed, the password that is input in S206 is a password that corresponds to the first SSID.

The processing unit 110 transmits the first SSID and the password, which is input in S206, to the electronic equipment 200 through the BLE connection (S207). As will be described later with reference to S303 in FIG. 5 or the like, based on the first SSID and the password that are received from the terminal apparatus 100 through the BLE connection, the processing unit 210 of the electronic equipment 200 establishes the wireless communication conforming to the Wi-Fi standards with the access point 300 using the first communication unit 221.

It is noted that when the first SSID is present in the SSID list of the electronic equipment 200, the terminal apparatus 100 does not make a request to the electronic equipment 200 for the SSID list. This serves the object of shortening at least the time the user waits, because it takes time to transmit the SSID list at a communication speed in compliance with the wireless communication scheme in compliance with the BLE standards. However, a modification implementation may be employed in which the electronic equipment 200 transmits the SSID list to the terminal apparatus 100 through BLE communication and in which it is determined on the terminal apparatus 100 side whether the first SSID is included in the SSID list.

On the other hand, in a case where the notification of the failure as a result of the acknowledgment of the SSID is received, the first SSID that is used by the terminal apparatus 100 for connection is equivalent to a case where the electronic equipment 200 is not capable of conducting a search. In this case, processing in S205 is performed. Specifically, the processing unit 110 of the terminal apparatus 100 makes a request to the electronic equipment 200 for the SSID list through the BLE connection (S2051). According to the request for the SSID list from the terminal apparatus 100, the processing unit 210 of the electronic equipment 200 transmits the SSID list, which is stored in the storage unit 260, to the terminal apparatus 100 through the BLE connection using the second communication unit 222 (S2052). The processing unit 110 of the terminal apparatus 100 displays a screen for urging the user to select one from among SSIDs that are included in the SSID list received from the electronic equipment 200 through the BLE connection, on the display unit 130, and the user applies an operation of selecting the SSID to the processing unit 110 (S2053).

Incidentally, there are cases where one access point 300 has a plurality of SSIDs. For example, if the access point 300 is capable of performing communication by the first frequency band and the second frequency band, the access point 300 includes the first wireless communication device that performs communication using the first frequency band, and a second wireless communication device that performs communication using the second frequency band. Then, different SSIDs are assigned to the first wireless communication device and the second wireless communication device respectively. More specifically, the first frequency band is a 5 GHz band, and the second frequency band is a 2.4 GHz band. That is, the first wireless communication device is a device that performs communication which corresponds to standards such as IEEE802.11a, IEEE802.11n, and IEEE802.11ac, and the second wireless communication device is a device that performs communication which corresponds to standards such as IEEE802.11b, IEEE802.11g, and IEEE802.11n. Also, when the access point 300 supports a plurality of communication standards in the first wireless communication scheme, it is assumed that in accordance with the communication standard, a plurality of different SSIDs are included and, differences in communication standards are not limited to the difference of the communication frequency bands.

However, the terminal apparatus 100 makes a connection to the first wireless communication device and the electronic equipment 200 makes a connection to the second wireless communication device, the terminal apparatus 100 and the electronic equipment 200 are also connected to the same access point 300. That is, even when the first SSID does not exist in the SSID list, there remains room where the terminal apparatus 100 and the electronic equipment 200 can be connected to the same access point 300. Therefore, in the process of S2053, the processing unit 110 performs processing that displays an SSID which has a high probability of corresponding to an access point that is the same as the access point 300 to which terminal apparatus 100 is being connected, in a manner that is emphasized for visibility or in a manner that takes precedence, and thus assists the user in the selection.

When any SSID is selected from the SSID list, the processing unit 110 displays the password input screen on the display unit 130, and a password of the SSID selected from the password input screen is input to the processing unit 110 (S206). In a case where the processing in S205 is performed, the password that is input in S206 is a password that corresponds to the SSID selected from the SSID list. The processing unit 110 transmits the SSID selected in S2053 and the password that is input in S206, to the electronic equipment 200 through the BLE connection (S207).

By the above processing, since the electronic equipment 200 acquires the SSID and the password, it becomes possible to attempt to connect conforming to Wi-Fi standards to the access point 300 by the first communication unit 221. However, as mentioned above, only by the above processing, the terminal apparatus 100 cannot grasp whether the connection between the electronic equipment 200 and the access point 300 was successful.

Figure 5:
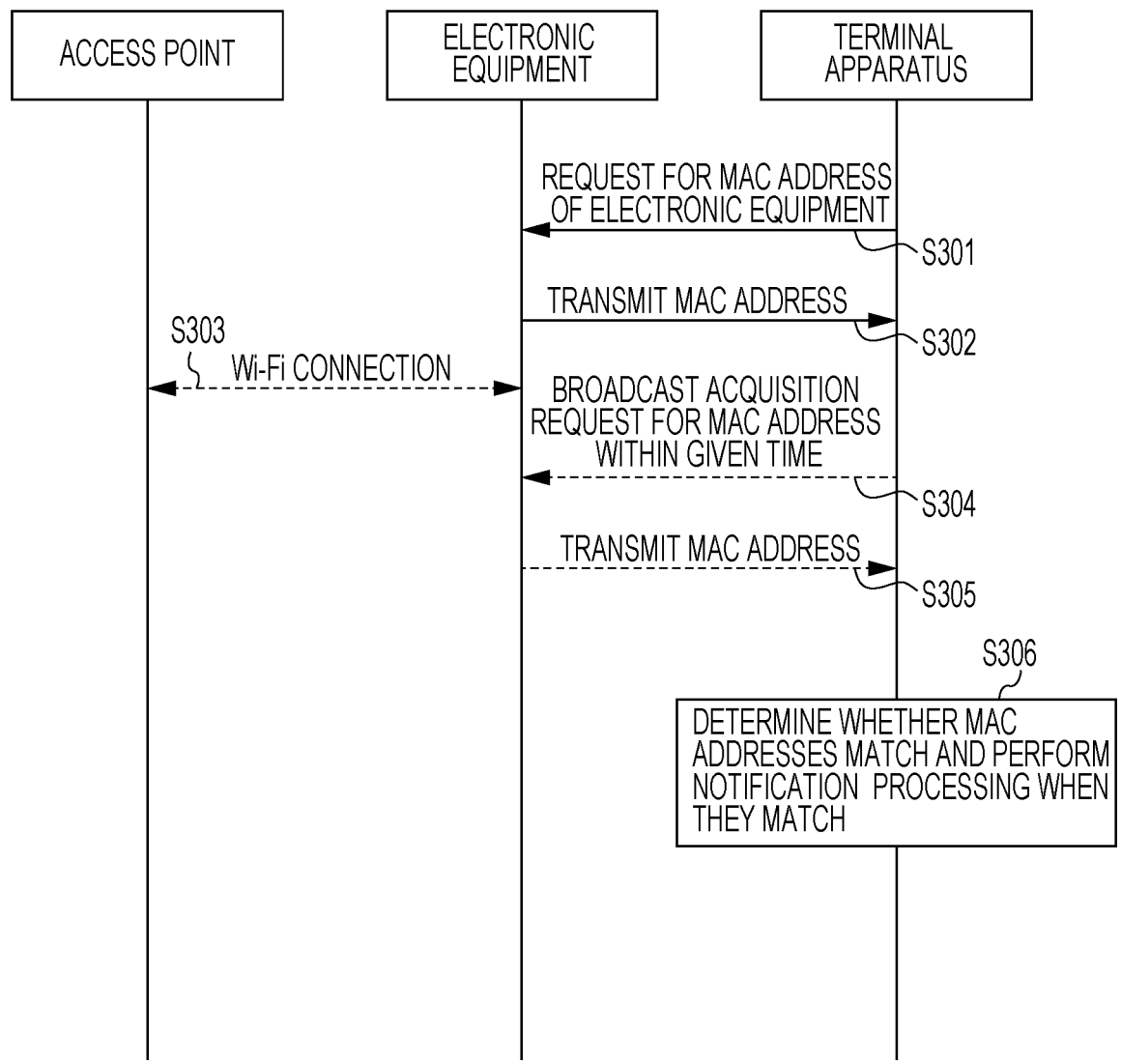
FIG. 5 is a diagram for describing a notification sequence of a result of a wireless connection.

FIG. 5 is a diagram for explaining a processing sequence for notifying the terminal apparatus 100, whether the connection between the electronic equipment 200 and the access point 300 was successful. Note that, in the communication between the pieces of equipment shown in FIG. 5, the communication through BLE is represented by the solid line, and the communication in compliance with Wi-Fi is represented by a broken line. The same applies to FIGS. 6 to 9 to be described later.

The processing unit 110 of the terminal apparatus 100 performs an acquisition request for the MAC address of the electronic equipment 200 through the BLE connection by the second communication unit 122 (S301). The processing unit 110 of the electronic equipment 200 transmits the MAC address of the electronic equipment 200 to the terminal apparatus 100 through the BLE connection by the second communication unit 222, as a response to the acquisition request (S302). That is, the communication unit 120 of the terminal apparatus 100 receives the identifier of the electronic equipment 200 from the electronic equipment 200 in compliance with the second wireless communication scheme.

Also, the electronic equipment 200 attempts a Wi-Fi connection to the access point 300 through the first communication unit 221 using the acquired SSID and password in S207. When the SSID and the password are appropriate, the Wi-Fi connection between the electronic equipment 200 and the access point 300 is established (S303).

The transmission and reception of the MAC address through the BLE connection shown in S301 and S302, and the establishment of the Wi-Fi connection shown in S303 can be performed in parallel regardless of the execution order. For example, the terminal apparatus 100 transmits the SSID in S207, and then transmits an acquisition request for the MAC address in S301. The electronic equipment 200 receives the SSID in S207, and then starts the Wi-Fi connection to the access point 300 and returns a response for S302 at the timing of receiving the acquisition request for the MAC address. Since it takes tens of seconds to several tens of seconds from the acquisition of the SSID and the password to the completion of the Wi-Fi connection, the processes in S301 and S302 are considered to be finished before S303, but the process in S303 may be finished first. Also, the transmission and reception of the MAC address through the BLE connection shown in S301 and S302 may be performed before the processing of S207.

The communication unit 120 of the terminal apparatus 100 broadcasts the acquisition request for an identifier to the network, after the transmission of the SSID by the second wireless communication scheme, in compliance with the first wireless communication scheme. Specifically, the processing unit 110 broadcasts the acquisition request for MAC address through the Wi-Fi connection by the first communication unit 121 (S304). As shown in FIG. 2, in the present embodiment, it is assumed that the terminal apparatus 100 and the electronic equipment 200 are connected to the same access point 300. Therefore, when the connection between the electronic equipment 200 and the access point 300 is completed, since the terminal apparatus 100 and the electronic equipment 200 belong to the same network segment, a broadcast packet transmitted from the terminal apparatus 100 can reach the electronic equipment 200.

The processing unit 210 of the electronic equipment 200 can recognize that the packet is for the acquisition request of the MAC address, by referring to the contents of the broadcast packet from the terminal apparatus 100. Thus the processing unit 210 returns its own MAC address to the terminal apparatus 100 through the access point 300 by the already established Wi-Fi connection in S303 (S305).

The communication unit 120 of the terminal apparatus 100 receives the identifier of the electronic equipment 200 in compliance with the first wireless communication scheme as a response to the broadcast transmission request. The processing unit 110 of the terminal apparatus 100 determines whether the MAC address received in S302 matches the MAC address received in S305, and performs notification processing when the MAC addresses match (S306). The case where the two MAC addresses match corresponds to a case where the night communication is performed with the electronic equipment 200 which is the target of connection setting, in compliance with Wi-Fi standards through the access point 300. Therefore, the processing unit 110 determines that the connection between the electronic equipment 200 and the access point 300 is successful, and executes notification processing of notifying the user of that effect (S306). The notification processing here is, for example, a process of displaying text, an icon, and an image indicating a successful connection on the display unit 130. However, the notification processing is not limited to this, and may be an output of sound or the like by a speaker, or may be light emission of a light emitting unit such as a light emitting diode (LED).

The broadcast in S304 is started with, for example, the transmission of the SSID in S207 as a trigger. Alternatively, in view of the fact that the determination whether the MAC addresses match in S306 cannot be executed unless the two MAC addresses are aligned, the broadcast may be started with the reception of the MAC address in S302 as a trigger, and the specific start timing can be variously modified. After the start timing, the communication unit 120 of the terminal apparatus 100 continuously executes the broadcast shown in S304 at a given interval until a given termination condition is satisfied. The following two are examples of the given termination conditions.

The first termination condition is that the MAC addresses are determined to match in S306, and notification processing is performed. When the broadcast is performed at a timing before the connection between the electronic equipment 200 and the access point 300 is successful, the electronic equipment 200 does not transmit the MAC address because the broadcast packet does not reach the electronic equipment 200. When there is another equipment on the network, the MAC address of the other equipment may be returned, but the MAC address matching the MAC address received in S302 is not received. When the matching MAC address is not received, it means that the connection between the electronic equipment 200 and the access point 300 is not confirmed, so the processing unit 110 does not perform notification processing and continues broadcasting. The first termination condition may be considered as a normal termination condition.

The second termination condition is that the broadcast is continued for a given time. The given time here is a time for determining a timeout, and the specific length thereof can be set variously. The given time is preferably long from the viewpoint of reliably completing the Wi-Fi connection, but is preferably short from the viewpoint of not keeping the user waiting. The given time is set to a value depending on the situation, for example, in consideration of the above two points. The processing unit 110 determines that the connection between the electronic equipment 200 and the access point 300 has failed when it is not possible to receive a matching MAC address even after waiting for a given time, and finishes the broadcast. In this case, the processing unit 110 may perform notification processing of notifying a connection failure, or may execute processing to be described later with reference to FIG. 9. The second termination condition can be considered as an abnormal termination condition.

As described above, in the method illustrated in FIG. 5, the terminal apparatus 100 periodically transmits a broadcast packet to check the connection state between the electronic equipment 200 and the access point 300. In many cases, the IP address of the electronic equipment 200 is dynamically assigned when the connection to the access point 300 is completed. Therefore, in order to perform communication in which the IP address of the electronic equipment 200 is designated from the terminal apparatus 100, a communication sequence is required in which the terminal apparatus 100 receives the IP address of the electronic equipment 200 after the connection between the electronic equipment 200 and the access point 300 is successful, so the processing becomes complicated. In that respect, it is possible to transmit an acquisition request for the MAC address without specifying the IP address of the electronic equipment 200 by using the broadcast as in S304 of FIG. 5.

However, since the broadcast packet is a packet that also reaches other equipment in the network, there arises a problem that it is difficult to determine whether the transmission source of the packet to be returned is the electronic equipment 200 or not. In that respect, in the method in FIG. 5, the MAC address is acquired in response to the broadcast, and the MAC address and the MAC address received in advance through the BLE connection are determined whether they match. By this, it is possible to appropriately determine whether the equipment that is the reply source is the electronic equipment 200 or not. In other words, since the processing unit 110 can determine whether the equipment that has performed communication using the Wi-Fi connection is the electronic equipment 200 to be set, it is possible to execute appropriate notification processing.

The electronic equipment 200 may hold a plurality of MAC addresses. For example, the electronic equipment 200 can use the first MAC address in the first communication unit 221, and can use the second MAC address different from the first MAC address in the second communication unit 222. In this case, the MAC address to be used is optional. For example, the first MAC address may be transmitted in both S302 and S305, and the second MAC address may be transmitted in both S302 and S305. Alternatively, both the first MAC address and the second MAC address may be transmitted in S302, and any one of the first MAC address and the second MAC address may be transmitted in S305. The same applies to the case where the electronic equipment 200 includes three or more MAC addresses, and when the MAC address transmitted through the BLE connection in S302 is associated with the MAC address transmitted through the Wi-Fi connection in S305, it is possible to use any MAC address for processing.

2.2.2 Wait Method

Figure 6:
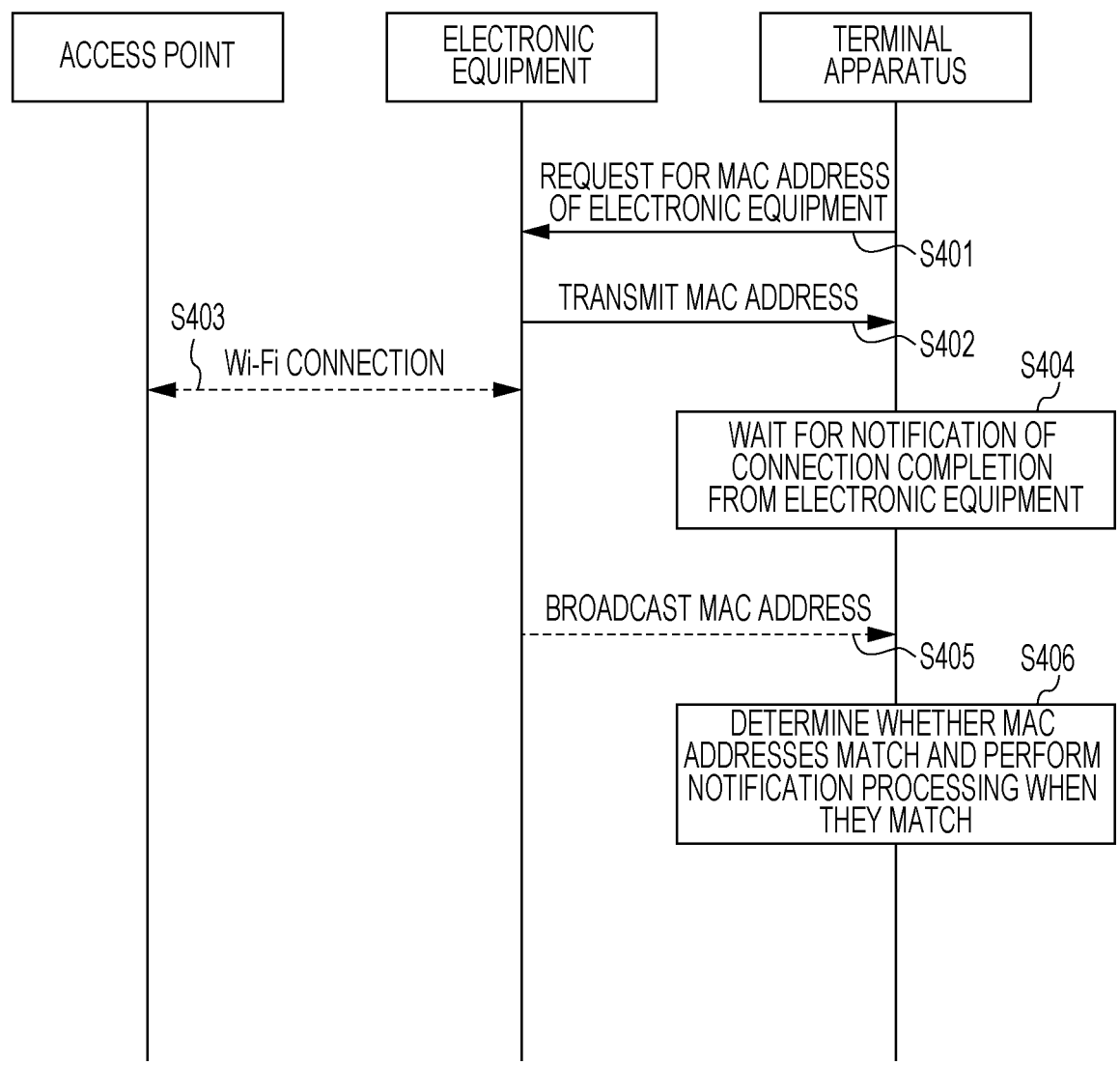
FIG. 6 is a diagram for describing a notification sequence of a result of a wireless connection.

FIG. 6 is a diagram for explaining another processing sequence for notifying in the terminal apparatus 100 whether the connection between the electronic equipment 200 and the access point 300 is successful. Similar to the above-described example, the processes shown in FIGS. 3 and 4 are executed prior to the process of FIG. 6. Since S401 to S403 in FIG. 6 are the same as S301 to S303 in FIG. 5, the detailed description will be omitted.

After the communication unit 120 of the terminal apparatus 100 transmits the SSID in compliance with the second wireless communication scheme, the communication unit 120 receives the data including the identifier broadcasted by the electronic equipment 200 in compliance with the first wireless communication scheme, thereby the identifier is received in compliance with the first wireless communication scheme. In this way, the terminal apparatus 100 can acquire the MAC address of the electronic equipment 200 using the Wi-Fi connection by waiting for the broadcast packet of the electronic equipment 200. Also in this case, since the MAC address of the electronic equipment 200 can be acquired using both the BLE connection and the Wi-Fi connection, appropriate notification processing based on the match determination can be performed.

Specifically, after the transmission of the SSID shown in S207, the processing unit 110 performs standby processing of waiting for a notification of a connection completion from the electronic equipment 200 for a given time (S404). The given time here is a time for determining a timeout, and the specific length thereof can be set variously. For example, the given time is a time of approximately the same length as the time of continuing the broadcast shown in S304 in FIG. 5.

When the connection to the access point 300 is established based on the SSID acquired in S207 (S403), the electronic equipment 200 broadcasts its own MAC address to the network using the Wi-Fi connection (S405). When the connection between the electronic equipment 200 and the access point 300 is completed, the broadcast packet transmitted from the electronic equipment 200 can reach the terminal apparatus 100 because the terminal apparatus 100 and the electronic equipment 200 belong to the same network segment. Note that, the broadcast executed in S405 may be performed only once, but may be executed plural times in consideration of a communication error or the like.

When the processing unit 110 of the terminal apparatus 100 receives the broadcast packet from the electronic equipment 200 during the standby processing in S404, the processing unit 110 acquires the MAC address included in the packet. Then, the processing unit 110 determines whether the MAC address received in S402 matches the MAC address received in S405, and performs notification processing when the MAC addresses match (S406).

On the other hand, when the matching MAC address cannot be received during the standby processing in S404, the processing unit 110 determines that the connection between the electronic equipment 200 and the access point 300 has failed. In this case, the processing unit 110 may perform notification processing of notifying a connection failure, or may execute processing to be described later with reference to FIG. 9.

As described above, in the method illustrated in FIG. 6, the electronic equipment 200 transmits a broadcast packet, and the terminal apparatus 100 waits for a notification from the electronic equipment 200, thereby confirming the connection state between the electronic equipment 200 and the access point 300. Since the broadcast is used, the electronic equipment 200 can transmit the MAC address without specifying the IP address of the terminal apparatus 100. In addition, since the determination of whether the MAC addresses match is performed, the processing unit 110 can appropriately determine whether the equipment that has performed communication by the Wi-Fi connection is the electronic equipment 200 to be set.

The point that the electronic equipment 200 may hold a plurality of MAC addresses and that the MAC address used for the process can be variously modified are the same as in the example described above with reference to FIG. 5.

2.3 Determination Based on IP Address

Figure 7:
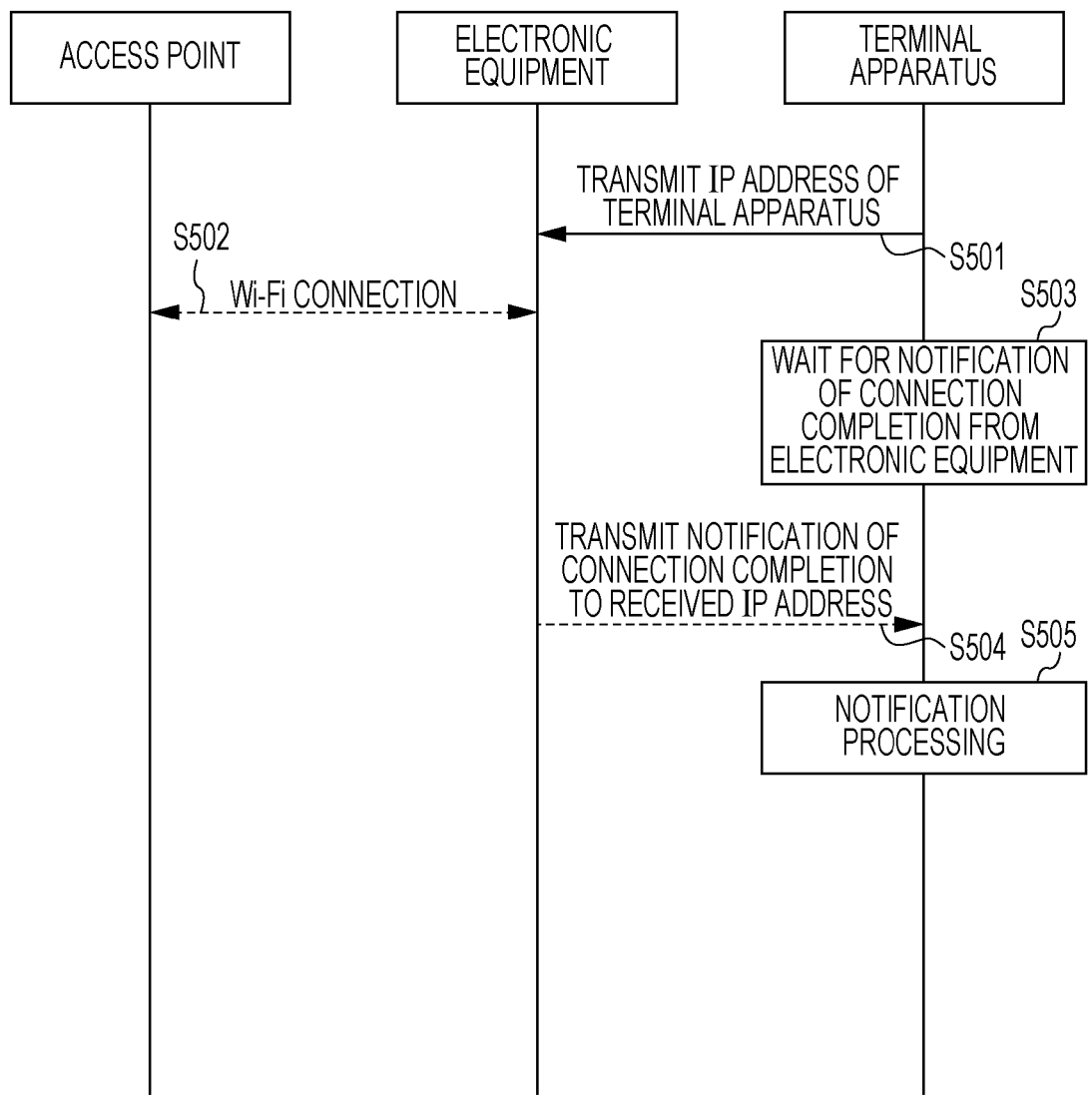
FIG. 7 is a diagram for describing a notification sequence of a result of a wireless connection.

FIG. 7 is another diagram illustrating a processing sequence for notifying in the terminal apparatus 100, whether the connection between the electronic equipment 200 and the access point 300 is successful. As in the above-described example, the processes shown in FIGS. 3 and 4 are executed prior to the process of FIG. 7. First, the processing unit 110 of the terminal apparatus 100 transmits its own IP address to the electronic equipment 200 through the BLE connection by the second communication unit 122 (S501). Since the terminal apparatus 100 of the present embodiment is already connected to the access point 300, the IP address of the terminal apparatus 100 is already known.

Also, the electronic equipment 200 attempts a Wi-Fi connection to the access point 300 through the first communication unit 221 using the SSID and the password acquired in S207. When the SSID and the password are appropriate, the Wi-Fi connection is established between the electronic equipment 200 and the access point 300 (S502).

The transmission and reception of the IP address through the BLE connection shown in S501 and the establishment of the Wi-Fi connection shown in S502 can be performed in parallel regardless of the execution order. For example, after the transmission of the SSID in S207, the terminal apparatus 100 continues to transmit the IP address in S501. Also, the terminal apparatus 100 may transmit its own IP address first, and then transmit the SSID.

The processing unit 110 of the terminal apparatus 100 performs notification processing of notifying that the connection between the electronic equipment 200 and the access point 300 is successful when the communication unit 120 received a notification from the electronic equipment 200 in compliance with the first wireless communication scheme within a given time set based on the transmission timing of the IP address or the transmission timing of the SSID. By notifying the IP address of the terminal apparatus 100, Wi-Fi communication between the terminal apparatus 100 and the electronic equipment 200 becomes possible without using a broadcast. Therefore, when compared with the methods shown in FIGS. 5 and 6, the method of FIG. 7 does not compress the bandwidth of the network.

Specifically, the processing unit 110 performs standby processing of waiting for a notification of a connection completion from the electronic equipment 200 for a given time (S503). As can be understood from this process, the method shown in FIG. 7 is a wait method of waiting for a notification from the electronic equipment 200. The given time here is a time for determining a timeout, and the specific length thereof can be set variously. For example, the given time is a time of approximately the same length as the time of continuing the broadcast shown in S304 in FIG. 5.

When the connection to the access point 300 is established based on the SSID acquired in S207 (S502), the electronic equipment 200 transmits a notification notifying a connection completion to the IP address received in S501 using the Wi-Fi connection (S504).

When the processing unit 110 of the terminal apparatus 100 receives a notification from the electronic equipment 200 during the standby processing in S503, the processing unit 110 determines that the Wi-Fi communication with the electronic equipment 200 through the access point 300 has been performed. That is, the processing unit 110 determines that the connection between the electronic equipment 200 and the access point 300 is successful, and executes notification processing of notifying that effect (S505).

When the notification cannot be received during the standby processing in S503, the processing unit 110 determines that the connection between the electronic equipment 200 and the access point 300 has failed. In this case, the processing unit 110 may perform notification processing of notifying a connection failure, or may execute processing to be described later with reference to FIG. 9.

In the processing sequence shown in FIG. 7, the determination of whether the MAC addresses match is not performed. Therefore, the processing unit 110 of the terminal apparatus 100 cannot strictly determine whether the equipment which is the transmission source of the notification in S504 is the electronic equipment 200 to be set, but this is permitted for the following reason. When the terminal apparatus 100 performs a broadcast as in S304 of FIG. 5, a response may be returned from equipment on the network other than the electronic equipment 200. When the electronic equipment 200 performs a broadcast as in S405 of FIG. 6, when another electronic equipment happens to perform connection setting, a broadcast packet from the electronic equipment may reach the terminal apparatus 100. On the other hand, in the method shown in FIG. 7, the electronic equipment 200 performs notification by designating the IP address of the terminal apparatus 100 used for connection setting. Therefore, the terminal apparatus 100 has a low probability of receiving a notification from equipment other than the electronic equipment 200 which is the setting target of the terminal apparatus 100. Also, considering that the given time for waiting in S503 is not extremely long, when the notification is received within the given time, it is possibly considered to be a notification from the electronic equipment 200 which is the setting target.

Alternatively, the notification from the electronic equipment 200 may have a specific attribute. For example, the notification includes information indicating that the electronic equipment 200 has connected to the access point 300. Then, when the communication unit 120 receives the notification within a given time, the processing unit 110 performs notification processing of notifying that the connection between the electronic equipment 200 and the access point 300 is successful.

The possibility that equipment different from the electronic equipment 200 transmits a notification designating the IP address of the terminal apparatus 100 for a purpose other than the notification of a connection success cannot be denied. In that respect, by including information indicating that the electronic equipment 200 is connected to the access point 300 in the notification from the electronic equipment 200, the processing unit 110 can determine for what purpose the notification is transmitted. The processing unit 110 performs notification processing on the condition that the notification is received within the given time and the notification includes information indicating that the electronic equipment 200 has connected to the access point 300. In this way, it is possible to suppress an erroneous determination that the notification from another equipment is the notification from the electronic equipment 200 to be set.

The information indicating that the electronic equipment 200 is connected to the access point 300 may be recognized by both the terminal apparatus 100 and the electronic equipment 200 to that effect, and the specific form of the information does not matter.

2.4 Determination Based on Combination of MAC Address and IP Address

As described above, in the method shown in FIG. 7, when the terminal apparatus 100 receives a notification, the processing unit 110 may not exactly specify the equipment that is the transmission source of the notification. However, in order to accurately determine whether the connection between the electronic equipment 200 and the access point 300 is successful, it is not prevented to use the identifier of the electronic equipment 200 together.

Figure 8:
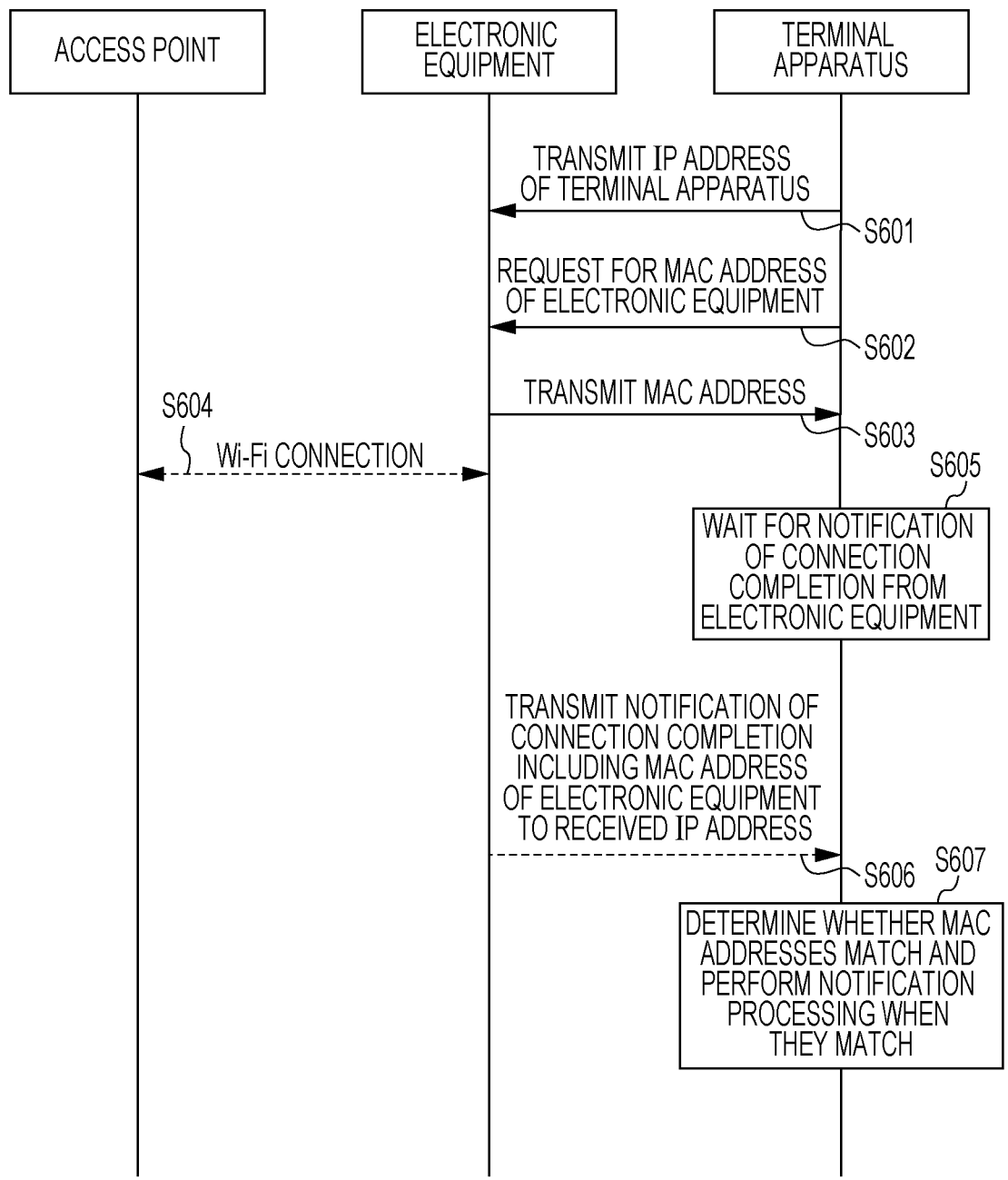
FIG. 8 is a diagram for describing a notification sequence of a result of a wireless connection.

FIG. 8 is another diagram for explaining a processing sequence for notifying whether the connection between the electronic equipment 200 and the access point 300 is successful in the terminal apparatus 100. The communication unit 120 of the terminal apparatus 100 transmits the IP address of the terminal apparatus 100 to the electronic equipment 200 in compliance with the second wireless communication scheme (S601), and receives the identifier of the electronic equipment 200 from the electronic equipment 200 in compliance with the second wireless communication scheme. The reception of the identifier of the electronic equipment 200 is realized by the transmission of the acquisition request for the MAC address of the electronic equipment 200 (S602) and the transmission of the MAC address by the electronic equipment 200 (S603) as in S301 and S302 of FIG. 5. The order of each process of S601 to S603 is not limited as long as S603 is performed after S602.

Then, the communication unit 120 of the terminal apparatus 100 receives the notification including the identifier of the electronic equipment 200 from the electronic equipment 200 in compliance with the first wireless communication scheme. The processing unit 110 performs notification processing of notifying that the connection between the electronic equipment 200 and the access point 300 is successful when the communication unit 120 receives the notification within a given time and determines that the identifier included in the notification matches the identifier received in compliance with the second wireless communication scheme. In this way, it is possible to accurately determine whether the transmission source of the notification is the electronic equipment 200 to be set, while suppressing the compression of the network band.

Specifically, the processing unit 110 performs standby processing of waiting for a notification of a connection completion from the electronic equipment 200 for a given time (S605). When the connection to the access point 300 is established based on the SSID acquired in S207 (S604), the electronic equipment 200 transmits a notification notifying a connection completion to the IP address received in S601 using the Wi-Fi connection (S606). The notification transmitted in S606 includes the MAC address of the electronic equipment 200.

When the processing unit 110 of the terminal apparatus 100 receives a notification from the electronic equipment 200 during the standby processing in S605, the processing unit 110 acquires the MAC address included in the notification. Then, the processing unit 110 determines whether the MAC address received in S603 matches the MAC address received in S606, and performs notification processing when the MAC addresses match (S607).

When the matching MAC address cannot be received during the standby processing in S605, the processing unit 110 determines that the connection between the electronic equipment 200 and the access point 300 has failed. In this case, the processing unit 110 may perform notification processing of notifying a connection failure, or may execute processing to be described later with reference to FIG. 9.

2.5 Modifications

Hereinafter, some modifications will be described.

2.5.1 Processing at the Time of Connection Failure

As described above with reference to FIGS. 5 to 8, when the timeout is detected, the processing unit 110 of the terminal apparatus 100 determines that the connection between the electronic equipment 200 and the access point 300 has failed. In the example described above with reference to FIG. 5, the processing unit 110 of the terminal apparatus 100 determines a timeout when the processing unit 110 broadcasts an acquisition request for a MAC address at a given time, and there is no reply for an appropriate MAC address with respect to the broadcast. In the examples described above with reference to FIGS. 6 to 8, the processing unit 110 of the terminal apparatus 100 determines a timeout when the processing unit 110 waits for a notification from the electronic equipment 200 for a given time, and there is no appropriate notification within the given time.

When a timeout is detected, the processing unit 110 may perform notification processing of notifying that the connection between the electronic equipment 200 and the access point 300 has failed. However, it is difficult for the user to take appropriate measures even if the user is simply notified of the failure. Therefore, the processing unit 110 may perform processing corresponding to the cause of the failure or may present an alternative plan.

FIG. 9 is a diagram for explaining the processing sequence when the connection between the electronic equipment 200 and the access point 300 has failed. When the processing unit 110 detects a timeout (S701), the communication unit 120 transmits an inquiry about the cause why the connection between the electronic equipment 200 and the access point 300 is unsuccessful to the electronic equipment 200 in compliance with the second wireless communication scheme (S702). The case of detecting a timeout is a case where, as described above, the processing unit 110 determines that the connection between the electronic equipment 200 and the access point 300 has failed. The determination target of the success and failure is a connection between the electronic equipment 200 and the access point 300, and the equipment capable of estimating the cause is not the terminal apparatus 100 but the electronic equipment 200. Processing in S701 and S702 makes it possible for the terminal apparatus 100 to inquire about the cause of the connection failure at appropriate timing. Since the terminal apparatus 100 and the electronic equipment 200 failed to transmission and reception of the data through Wi-Fi, a different communication method such as BLE is used for the inquiry.

The electronic equipment 200 answers the cause of failure using the BLE connection in response to the inquiry in the S702 (S703). For example, when the connection to the access point 300 has failed due to an error of the password, the communication unit 220 of the electronic equipment 200 is capable of recognizing that effect. Therefore, the electronic equipment 200 responds, in S703, with information indicating whether the failure is due to an erroneous input of the password.

When the communication unit 120 of the terminal apparatus 100 receives a notification that the connection between the electronic equipment 200 and the access point 300 has failed from the electronic equipment 200 in compliance with the second wireless communication scheme, the processing unit 110 performs notification processing of urging a re-input of the password corresponding to the SSID (S704). More specifically, as shown in FIG. 9, when the notification indicating that the cause of the connection failure is due to an erroneous input of the SSID is received, the processing unit 110 performs the notification processing in S704. In this way, it is possible to urge the user to take appropriate measures according to the cause. The above notification is performed after the electronic equipment 200 attempts to connect to the access point 300. The communication unit 120 of the terminal apparatus 100 transmits the SSID to the electronic equipment 200 as shown in S207, and then receives the above notification.

In addition, when the notification indicating that the cause of the connection failure is not the erroneous input of the SSID is received, various processes by the processing unit 110 are conceivable. For example, the processing unit 110 performs notification processing of urging a direct connection between the electronic equipment 200 and the terminal apparatus 100. The direct connection means that the terminal apparatus 100 and the electronic equipment 200 are connected to each other not through the external access point 300. Hereinafter, this connection mode is referred to as a direct connection. When the direct connection is performed, one of the terminal apparatus 100 and the electronic equipment 200 activates an internal access point, and the other connects to the internal access point. In this way, the transmission and reception of data using Wi-Fi connection become possible between the terminal apparatus 100 and the electronic equipment 200 not through the external access point 300.

For example, the communication unit 120 of the terminal apparatus 100 transmits a request for validating the internal access point to the electronic equipment 200 through the BLE connection. When receiving the request, the electronic equipment 200 performs processing for starting the internal access point. The terminal apparatus 100 performs connection to the electronic equipment 200 using the SSID and the password corresponding to the internal access point of the electronic equipment 200.

For example, the communication unit 120 of the terminal apparatus 100 transmits a request for displaying the SSID and the password of the internal access point through the BLE connection to the electronic equipment 200. The electronic equipment 200 displays the SSID and the password corresponding to the internal access point on the display unit 230. The user browses the display unit 230 and inputs the SSID and the password using the operation unit 140 of the terminal apparatus 100. Thereby, the terminal apparatus 100 and the electronic equipment 200 are directly connected to each other. Although here, an example of displaying the SSID and the password itself on a display unit 230 is shown, a QR code (registered trademark) representing the SSID and the password may be displayed. The terminal apparatus 100 acquires the SSID and the password by imaging the QR code using the imaging unit.

Alternatively, the direct connection between the terminal apparatus 100 and the electronic equipment 200 may be performed using Wi-Fi direct (WFD). When the WFD is used, connection can be easily realized by specifying the device name of the equipment which is the connection target without directly inputting the SSID or the password by the user. For example, the communication unit 120 of the terminal apparatus 100 transmits a request for displaying a device name to the electronic equipment 200 through the BLE connection. The electronic equipment 200 displays its own device name on the display unit 230. The user browses the display unit 230 and uses the operation unit 140 of the terminal apparatus 100 to select a device with the displayed device name. Thereby, the terminal apparatus 100 and the electronic equipment 200 are directly connected to each other.

Alternatively, when the notification indicating that the cause of the connection failure is not the erroneous input of the SSID is received, the processing unit 110 performs notification processing of urging an execution of cloud printing. Cloud printing refers to processing of transmitting print data from the terminal apparatus 100 to the electronic equipment 200 through the Internet and executing printing. As shown in S205 of FIG. 4, when the SSID is selected from the list information, there is a possibility that the access point to which the electronic equipment 200 is connected and the access point to which the terminal apparatus 100 has already been connected do not match. Therefore, although the connection itself between the electronic equipment 200 and a given access point is successful, there may be a case where direct communication between the terminal apparatus 100 and the electronic equipment 200 cannot be performed. In this case, since the terminal apparatus 100 and the electronic equipment 200 are considered to be able to communicate with each other through the Internet, appropriate printing processing can be performed by urging execution of cloud printing. Further, although an example in which the electronic equipment 200 is a printing device is considered here, the same applies to other devices. That is, when the notification indicating that the cause of the connection failure is not the erroneous input of the SSID is received, the processing unit 110 performs notification processing of urging transmission and reception of data between the terminal apparatus 100 and the electronic equipment 200 through the Internet.

Alternatively, when the notification indicating that the cause of the connection failure is not the erroneous input of the SSID is received, the processing unit 110 may perform notification processing of urging a termination of the connection processing between the electronic equipment 200 and the access point 300.

In the example of FIG. 9, the processing unit 110 indicates three options of direct connection, cloud printing, and termination of processing as options, and performs notification processing of urging a selection of one of the options (S705). When direct connection or cloud printing is selected, the processing unit 110 executes each of the above-described processes.

Further, FIG. 9 shows an example in which, when the cause of the connection failure is erroneous input of the password, notification processing of urging a re-input of the password is performed as shown in S704. However, if the password is repeatedly input erroneously, the user is not aware of the proper password, and even if the user is urged to re-input, it is unlikely that the proper password will be input. Therefore, the processing unit 110 may perform the processing in S705 if the erroneous input of the password has been performed a predetermined number of times.

Further, in FIG. 9, an example has been described in which the terminal apparatus 100 inquires about the cause why the connection between the electronic equipment 200 and the access point 300 is unsuccessful to the electronic equipment 200. However, the terminal apparatus 100 may wait for transmission of the cause from the electronic equipment 200. For example, when the connection to the access point 300 fails, the second communication unit 222 of the electronic equipment 200 transmits a notification to that effect to the terminal apparatus 100 in compliance with the second wireless communication scheme. When the second communication unit 122 receives the notification from the electronic equipment 200, the processing unit 110 of the terminal apparatus 100 executes processing in S704 or S705.

2.5.2 Direct Connection

FIG. 9 illustrates an example in which a direct connection between the terminal apparatus 100 and the electronic equipment 200 is urged when the connection between the electronic equipment 200 and the access point 300 fails and it is determined that the cause is not erroneous input of the password.

However, the direct connection between the terminal apparatus 100 and the electronic equipment 200 is not limited to this. For example, in FIG. 4, it is assumed that Wi-Fi connection between the terminal apparatus 100 and the access point 300 is established, and the communication unit 120 of the terminal apparatus 100 first transmits the first SSID through the BLE connection (S201). However, the processing unit 110 may determine whether the terminal apparatus 100 and the access point 300 are connected to each other before that. Then, when it is determined that the terminal apparatus 100 and the access point 300 are connected to each other, the processes after S201 are executed.

When the terminal apparatus 100 and the access point 300 are not connected to each other, even though connection between the electronic equipment 200 and the access point 300 is successful, communication between the terminal apparatus 100 and the electronic equipment 200 conforming to the Wi-Fi standards cannot be performed. Therefore, when it is determined that the terminal apparatus 100 and the access point 300 are not connected to each other, the processing unit 110 may perform notification processing of urging a direct connection between the terminal apparatus 100 and the electronic equipment 200. The specific processing after the notification processing is as described above.

2.5.3 Modifications of Connection Status Between Electronic Equipment and Access Point In the present embodiment, as described with reference to FIG. 5 or FIG. 6, a broadcast packet transmitted by either one of the terminal apparatus 100 or the electronic equipment 200 reaches the other equipment is a condition for determining that the connection between the electronic equipment 200 and the access point 300 is successful. Alternatively, as described with reference to FIG. 7 or FIG. 8, the packet transmitted by the electronic equipment 200 by designating the IP address of the terminal apparatus 100 reach the terminal apparatus 100 is a condition for determining that the connection between the electronic equipment 200 and the access point 300 is successful.

One of the purposes of connecting the electronic equipment 200 and the access point 300 is to transmit and receive data between the terminal apparatus 100 and the electronic equipment 200 using Wi-Fi. When communication by the broadcast described above or communication designating an IP address is possible, data can be transmitted and received between the terminal apparatus 100 and the electronic equipment 200 using Wi-Fi not through an external network such as the Internet. That is, the above condition can be considered as a condition for determining whether desired communication can be performed.

When the terminal apparatus 100 and the electronic equipment 200 are connected to the same access point, both of the above two conditions are satisfied. However, even if the terminal apparatus 100 and the electronic equipment 200 are not connected to the same access point, the condition may be satisfied. Hereinafter, two cases will be described.

For example, a case where the access point 300 is a layer 2 switch (L2SW) that does not have a router function is conceivable. And, a network in which a first access point that is L2SW and a second access point that is L2SW are connected without a router is conceivable. For example, a network may be considered in which the first access point and the second access point are connected to a common hub, and the hub is connected to a router. When the terminal apparatus 100 is connected to the first access point and the electronic equipment 200 is connected to the second access point, since the terminal apparatus 100 and the electronic equipment 200 belong to the same network segment, the broadcast packet transmitted by one equipment can reach the other equipment.

In addition, in an internal network such as a company intranet, there are many cases where a plurality of network segments are set. In the case of communication designating an IP address, there is a case where it is possible to transmit a packet from equipment belonging to the first network segment to equipment belonging to the second network segment through a router, although it also depends on the method of IP address assignment by the DHCP server. It is conceivable a case where the terminal apparatus 100 is connected to the access point belonging to the first network segment and the electronic equipment 200 is connected to the access point belonging to the second network segment. In this case, since the two network segments are segments of the same internal network, a packet transmitted by the electronic equipment 200 designating the IP address of the terminal apparatus 100 can reach the terminal apparatus 100.

In both cases described above, the terminal apparatus 100 and the electronic equipment 200 are connected to different access points. However, as long as the above conditions are satisfied, Wi-Fi communication between the terminal apparatus 100 and the electronic equipment 200 is possible, and the purpose of connecting the electronic equipment 200 and the access point 300 is achieved. Therefore, in the present embodiment, these cases are also permitted, and the processing unit 110 may determine that the connection between the electronic equipment 200 and the access point 300 is successful.

As described above, the state in which the terminal apparatus 100 and the electronic equipment 200 are connected to the same access point 300 is an example in which it is determined that the connection is successful, but the connection mode realized by the method of the present embodiment is not limited to this, and various modifications are possible. The processing unit 110 of the terminal apparatus 100 according to the present embodiment may determine whether the connection is successful based on whether communication between the terminal apparatus 100 and the electronic equipment 200 is possible, and it is not necessary to determine the specific connection mode.

3. Communication System, Program, and Others

Moreover, an application object of the method of the present embodiment is not limited to the terminal apparatus 100 described above. For example, as illustrated in FIG. 2, the method of the embodiment can be applied to the communication system 10 including the terminal apparatus 100 and the electronic equipment 200 described above.

Moreover, each part of the terminal apparatus 100 of the present embodiment may be implemented as a module of the program which operates on a processor. For example, the program includes a communication control module that controls the communication unit 120 and a processing module. The communication control module performs processing of transmitting the SSID corresponding to the access point 300 to be connected in the first wireless communication scheme to the electronic equipment 200 in compliance with the second wireless communication scheme, and receiving the identifier of the electronic equipment 200 from the electronic equipment 200 in compliance with the second wireless communication scheme. The communication unit 120 receives the identifier of the electronic equipment 200 transmitted by the electronic equipment 200 by the first wireless communication scheme, and the processing module performs determination whether the identifier received by the first wireless communication scheme and the identifier received by the second wireless communication scheme match. When it is determined that the two identifiers match, the processing module performs notification processing of notifying that the connection between the access point 300 and the electronic equipment 200 is successful.

Alternatively, the communication control module performs processing of transmitting the SSID corresponding to the access point 300 to be connected in the first wireless communication scheme to the electronic equipment 200 by the second wireless communication scheme, and transmitting the IP address of the terminal apparatus 100 to the electronic equipment 200 in compliance with the second wireless communication scheme. When the communication unit 120 receives a notification from the electronic equipment 200 in compliance with the first wireless communication scheme within a given time set based on the transmission timing of the IP address or the transmission timing of the SSID, the processing module performs notification processing of notifying that the connection between the electronic equipment 200 and the access point 300 is successful.

Moreover, the program, which implements processing which each part of the terminal apparatus 100 of the present embodiment performs, can be stored in the information storage medium which is a medium which is readable by a computer, for example. The information storage medium can be realized by, for example, an optical disk, a memory card, an HDD, or a semiconductor memory. The semiconductor memory is, for example, a read only memory (ROM). The processing unit 110 performs various processes of the present embodiment based on programs and data stored in the information storage medium. That is, a program for causing a computer to function as each unit of the terminal apparatus 100 of the present embodiment is stored in the information storage medium. The computer is an apparatus including an input device, a processing unit, a storage unit, and an output unit. The program is a program for causing a computer to execute the processing of each unit.

Further, the method of the present embodiment can be applied to the control method of the terminal apparatus 100 which executes a part or all of the steps shown in FIGS. 3 to 9, the operation method of the terminal apparatus 100, and the communication control method.

As described above, the terminal apparatus of the present embodiment includes the communication unit that communicates with the electronic equipment, and the processing unit that controls the communication unit. The communication unit transmits the SSID corresponding to the access point to be connected in the first wireless communication scheme of the electronic equipment to the electronic equipment in compliance with the second wireless communication scheme, and receives the identifier of the electronic equipment from the electronic equipment in compliance with the second wireless communication scheme. The processing unit performs notification processing of notifying that the connection between the electronic equipment and the access point has succeeded, when the communication unit receives the identifier of the electronic equipment transmitted by the electronic equipment in compliance with the first wireless communication scheme after the transmission of the SSID in compliance with the second wireless communication scheme, and it is determined that the identifier received in compliance with the first wireless communication scheme matches the identifier received in compliance with the second wireless communication scheme.

According to the method of the present embodiment, notification processing is performed in a case where the connection setting in the first wireless communication scheme of the electronic equipment using the terminal apparatus is performed, and when the identifier matching the identifier received in compliance with the second wireless communication scheme is received in compliance with the first wireless communication scheme. In this way, when the connection between the electronic equipment and the access point is successful, the terminal apparatus can notify that effect, thereby convenience can be improved.

Further, in the present embodiment, the communication unit may broadcast the acquisition request for the identifier to the network in compliance with the first wireless communication scheme after transmitting the SSID in compliance with the second wireless communication scheme, and may receive the identifier of the electronic equipment as a response to the acquisition request in compliance with the first wireless communication scheme.

In this way, it is possible to receive the identifier of the electronic equipment according to the first wireless communication scheme by making a request from the terminal apparatus side.

In the present embodiment, the communication unit may receive the identifier in compliance with the first wireless communication scheme, by receiving data including the identifier broadcasted by the electronic equipment after transmitting the SSID in compliance with the second wireless communication scheme.

In this way, by waiting for a broadcast from the electronic equipment, it becomes possible to receive the identifier of the electronic equipment in compliance with the first wireless communication scheme.

Further, the communication unit of the terminal apparatus of the present embodiment transmits the SSID corresponding to the access point which is the connection target in the first wireless communication scheme of the electronic equipment to the electronic equipment in compliance with the second wireless communication scheme, and transmits the IP address of the terminal apparatus to the electronic equipment in compliance with the second wireless communication scheme. The processing unit performs notification processing of notifying that the connection between the electronic equipment and the access point is successful, when the communication unit receives a notification from the electronic equipment in compliance with the first wireless communication scheme within a given time set based on the transmission timing of the IP address or the transmission timing of the SSID.

According to the method of the present embodiment, the notification processing is performed in a case of performing connection setting in the first wireless communication scheme of the electronic equipment using the terminal apparatus, when the notification is given to the own IP address notified in compliance with the second wireless communication scheme. In this way, when the connection between the electronic equipment and the access point is successful, the terminal apparatus can notify that effect, thereby convenience can be improved.

In the present embodiment, the communication unit may receive the identifier of the electronic equipment from the electronic equipment in compliance with the second wireless communication scheme, and may receive the notification including the identifier of the electronic equipment from the electronic equipment in compliance with the first wireless communication scheme. The processing unit may perform notification processing when the communication unit receives the notification within a given time, and determines that the identifier included in the notification and the identifier received in compliance with the second wireless communication scheme match.

In this way, by using the IP address and the identifier together, it is possible to suppress the pressure of the network band, and accurately determine whether the transmission source of the notification is the electronic equipment to be set.

In the present embodiment, the notification may include information indicating that the electronic equipment has connected to the access point. The processing unit performs notification processing when the communication unit receives the notification within a given time.

In this way, by using the IP address and the identifier together, it is possible to suppress the compression of the network bandwidth, and to determine whether the transmission source of the notification is the electronic equipment to be set using the notification attribute.

In the present embodiment, the processing unit may perform notification processing of urging re-input of a password corresponding to the SSID, when the communication unit transmits the SSID to the electronic equipment, and then receives the notification that connection between the electronic equipment and the access point has failed from the electronic equipment in compliance with the second wireless communication scheme.

In this way, when it is determined that the connection between the electronic equipment and the access point has failed, it is possible to urge the user to take appropriate measures.

Further, in the present embodiment, processing unit may perform notification processing of urging direct connection between the electronic equipment and the terminal apparatus, when the communication unit transmits the SSID to the electronic equipment, and then receives a notification that connection between the electronic equipment and the access point has failed from the electronic equipment by the second wireless communication scheme.

In this way, when it is determined that the connection between the electronic equipment and the access point has failed, it is possible to urge the user to take appropriate measures.

Further, in the present embodiment, when the processing unit determines that the connection between the electronic equipment and the access point has failed, the communication unit may transmit an inquiry about the cause why the connection between the electronic equipment and the access point is unsuccessful to the electronic equipment in compliance with the second wireless communication scheme.

In this way, it is possible to inquire the cause why the connection between the electronic equipment and the access point is unsuccessful from the terminal apparatus side.

Further, in the present embodiment, the communication unit may receive the SSID list acquired by scanning processing using the first wireless communication scheme by the electronic equipment, from the electronic equipment in compliance with the second wireless communication scheme, and may transmit the SSID selected by the user from the SSID list to the electronic equipment in compliance with the second wireless communication scheme as an SSID corresponding to the access point. The communication unit may also transmit the password corresponding to the SSID to the electronic equipment in compliance with the second wireless communication scheme.

In this way, the connection setting of the electronic equipment can be appropriately performed using the terminal apparatus.

Moreover, the communication system of the present embodiment includes a terminal apparatus described in any of the above and electronic equipment.

The program according to the present embodiment causes the computer to execute a process of transmitting the SSID corresponding to the access point to be connected in the first wireless communication scheme of the electronic equipment to the electronic equipment in compliance with the second wireless communication scheme. The program causes the computer to execute the process of receiving the identifier of the electronic equipment from the electronic equipment in compliance with the second wireless communication scheme, and the program causes the computer to execute notification processing of notifying that connection between the electronic equipment and the access point has succeeded when, after the SSID is transmitted in compliance with the second wireless communication scheme, receives the identifier of the electronic equipment transmitted by the electronic equipment is received in compliance with the first wireless communication scheme, and determines that the identifier received in compliance with the first wireless communication scheme matches the identifier received in compliance with the second wireless communication scheme.

The program according to the present embodiment causes the computer to execute a process of transmitting the SSID corresponding to the access point to be connected in the first wireless communication scheme of the electronic equipment to the electronic equipment in compliance with the second wireless communication scheme. The program also causes the computer to execute a process of transmitting the IP address of the terminal apparatus to the electronic equipment in compliance with the second wireless communication scheme. In addition, when the program receives a notification from the electronic equipment in compliance with the first wireless communication scheme within a given time set based on the transmission timing of the IP address or the transmission timing of the SSID, the program causes the computer to execute notification processing of notifying that the connection between the electronic equipment and the access point has succeeded.

It should be understood by those skilled in the art that, although the present embodiment has been described in detail as described above, many modifications can be made without substantially departing from the novel matters and effects of the present disclosure. Accordingly, all such modifications are intended to be included within the scope of the present disclosure. For example, in the specification or the drawings, the terms described together with the broader or synonymous different terms at least once can be replaced with the different terms anywhere in the specification or the drawings. Further, all combinations of the present embodiment and the modifications are also included in the scope of the present disclosure. Further, the configuration and operation of the terminal apparatus, the electronic equipment, and the communication system are not limited to those described in the present embodiment, and various modifications can be made.

What is claimed is:

1. A terminal apparatus comprising:
a communication unit that performs communication with an electronic equipment in compliance with a first wireless communication scheme and a second wireless communication scheme; and
a processor that performs control of the communication unit, wherein
the processor
transmits identification information of an access point to the electronic equipment via communication in compliance with the second wireless communication scheme, the access point being a connection target of the first wireless communication scheme,
receives a second identifier of the electronic equipment from the electronic equipment via communication in compliance with the second wireless communication scheme,
receives a first identifier of the electronic equipment from the electronic equipment via communication in compliance with the first wireless communication scheme, after the electronic equipment establishes the communication in compliance with the first wireless communication scheme based on the transmitted identification information of the access point,
determines whether the first identifier received via the communication in compliance with the first wireless communication scheme and the second identifier received via the communication in compliance with the second wireless communication scheme match, and
performs notification processing of notifying that a connection between the electronic equipment and the access point is successful when it is determined that the first identifier received via communication in compliance with the first wireless communication scheme matches the second identifier received via communication in compliance with the second wireless communication scheme.

2. The terminal apparatus according to claim 1, wherein the communication unit broadcasts an acquisition request for the identifier to a network in compliance with the first wireless communication scheme after the transmission of the identification information in compliance with the second wireless communication scheme, and receives the identifier of the electronic equipment in compliance with the first wireless communication scheme as a response to the acquisition request.

3. The terminal apparatus according to claim 1, wherein the communication unit receives data including the identifier broadcasted by the electronic equipment after the transmission of the identification information in compliance with the second wireless communication scheme to receive the identifier in compliance with the first wireless communication scheme.

4. A terminal apparatus comprising:
a communication unit that performs communication with an electronic equipment in compliance with a first wireless communication scheme and a second wireless communication scheme; and
a processor that performs control of the communication unit, wherein
the processor
transmits identification information of an access point to the electronic equipment via communication in compliance with the second wireless communication scheme, the access point being a connection target of the first wireless communication scheme, the transmitted identification information of the access point causing the electronic equipment to connect to the access point via communication in compliance with the first wireless communication scheme, and transmits an identifier of the terminal apparatus to the electronic equipment via communication in compliance with the second wireless communication scheme, the communication unit is configured to receive a notification from the electronic equipment via communication in compliance with the first wireless communication scheme after the electronic equipment establishes communication in compliance with the first wireless communication scheme based on the transmitted identification information of the access point, and the processor performs notification processing of notifying that a connection between the electronic equipment and the access point is successful in response to receiving the notification from the electronic equipment within a given time from a transmission timing of the identifier of the terminal apparatus or a transmission timing of the identification information of the access point.

5. The terminal apparatus according to claim 4, wherein the communication unit receives an identifier of the electronic equipment from the electronic equipment in compliance with the second wireless communication scheme, and receives the notification including the identifier of the electronic equipment from the electronic equipment in compliance with the first wireless communication scheme, and the processor performs the notification processing when the communication unit receives the notification within the given time, and it is determined that the identifier included in the notification matches the identifier received in compliance with the second wireless communication scheme.

6. The terminal apparatus according to claim 4, wherein the notification includes information indicating that the electronic equipment is connected to the access point, and the processor performs the notification processing when the communication unit receives the notification within the given time.

7. The terminal apparatus according to claim 1, wherein when the communication unit transmits the identification information to the electronic equipment and then receives a notification indicating that a connection between the electronic equipment and the access point is unsuccessful from the electronic equipment in compliance with the second wireless communication scheme, the processor performs notification processing of urging a re-input of a password corresponding to the identification information.

8. The terminal apparatus according to claim 1, wherein when the communication unit transmits the identification information to the electronic equipment and then receives a notification indicating that a connection between the electronic equipment and the access point is unsuccessful from the electronic equipment in compliance with the second wireless communication scheme, the processor performs notification processing of urging a direct connection between the electronic equipment and the terminal apparatus.

9. The terminal apparatus according to claim 7, wherein when the processor determines that the connection between the electronic equipment and the access point is unsuccessful, the communication unit transmits an inquiry about a cause why the connection between the electronic equipment and the access point is unsuccessful to the electronic equipment in compliance with the second wireless communication scheme.

10. The terminal apparatus according to claim 1, wherein the communication unit receives an identification information list acquired by the electronic equipment by scanning processing using the first wireless communication scheme from the electronic equipment in compliance with the second wireless communication scheme, transmits the identification information selected from the identification information list by a user to the electronic equipment in compliance with the second wireless communication scheme as the identification information corresponding to the access point, and transmits a password corresponding to the identification information to the electronic equipment in compliance with the second wireless communication scheme.

11. A non-transitory computer-readable storage medium storing a program, the program causing a computer to execute:

processing of transmitting identification information of an access point to electronic equipment via communication in compliance with a second wireless communication scheme, the access point being a connection target of a first wireless communication scheme;

processing of receiving a second identifier of the electronic equipment from the electronic equipment via communication in compliance with the second wireless communication scheme;

processing of receiving a first identifier of the electronic equipment from the electronic equipment via communication in compliance with the first wireless communication scheme, the electronic equipment establishing the communication based on the transmitted identification information of an access point;

processing of determining whether the first identifier received via the communication in compliance with the first wireless communication scheme and the second identifier received via the communication in compliance with the second wireless communication scheme match; and notification processing of notifying that a connection between the electronic equipment and the access point is successful when it is determined that the identifier received in compliance with the first wireless communication scheme matches the identifier received in compliance with the second wireless communication scheme.

* * * * *